United States Patent
Park et al.

(10) Patent No.: US 12,491,589 B2
(45) Date of Patent: Dec. 9, 2025

(54) CLAMPING JIG AND A WELDING SYSTEM INCLUDING THE SAME

(71) Applicants: HYUNDAI MOTOR COMPANY, Seoul (KR); KIA CORPORATION, Seoul (KR)

(72) Inventors: Jongmin Park, Ulsan (KR); Dong Ho Kwak, Ulsan (KR); Young Seok Lee, Ulsan (KR); Junhyeok Bae, Ulsan (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 342 days.

(21) Appl. No.: 18/368,184

(22) Filed: Sep. 14, 2023

(65) Prior Publication Data
US 2024/0375225 A1 Nov. 14, 2024

(30) Foreign Application Priority Data

May 10, 2023 (KR) .......... 10-2023-0060413

(51) Int. Cl.
*B25B 11/00* (2006.01)
*B23K 37/04* (2006.01)

(52) U.S. Cl.
CPC ............... *B23K 37/0443* (2013.01)

(58) Field of Classification Search
CPC ........... B25B 11/00; B25B 11/02; B23Q 3/00; B23Q 3/06; B23P 19/00; B23P 19/04; B23K 37/0443
See application file for complete search history.

(56) References Cited

U.S. PATENT DOCUMENTS

| | | | | |
|---|---|---|---|---|
| 5,373,633 | A  * | 12/1994 | Satoi ................... | B41J 2/14024 29/890.1 |
| 6,071,346 | A  * | 6/2000 | Yamauchi ........... | B05B 12/1463 118/302 |
| 6,193,046 | B1 * | 2/2001 | Segawa ................. | B62D 65/02 198/339.1 |
| 2006/0053932 | A1 * | 3/2006 | Sturm ................... | B62D 65/02 74/490.01 |
| 2023/0081213 | A1 * | 3/2023 | Blank ................... | B23Q 1/035 140/112 |
| 2024/0375225 | A1 * | 11/2024 | Park ................... | B23K 37/0443 |
| 2024/0391038 | A1 * | 11/2024 | Srikanth ............... | B25J 9/0084 |

* cited by examiner

*Primary Examiner* — Lee D Wilson
(74) *Attorney, Agent, or Firm* — Lempia Summerfield Katz LLC

(57) ABSTRACT

A clamping jig may include a support base movably provided in a conveyor, a central base on which a battery module assembly is seated in an upper portion of the support base, a front jig configured to pressurize and support the battery module assembly from a front side, a rear jig configured to pressurize and support the battery module assembly from a rear side, a left-side jig configured to pressurize and support the battery module assembly from a left side, a right-side jig configured to pressurize and support the battery module assembly from a right side, and a backup jig configured to support between a sensing board and a cell stack of the battery module assembly. In particular, the front jig, the rear jig, the left-side jig, the right-side jig, and the backup jig are movably provided according to a predetermined sequence.

20 Claims, 24 Drawing Sheets

CLAMPING JIG AND A WELDING SYSTEM INCLUDING THE SAME

CROSS-REFERENCE TO RELATED APPLICATION

This application claims priority to and the benefit of Korean Patent Application No. 10-2023-0060413 filed in the Korean Intellectual Property Office on May 10, 2023, the entire contents of which are incorporated herein by reference.

BACKGROUND

(a) Field

The present disclosure relates to a clamping jig of a battery module assembly and a welding system including the same.

(b) Description of the Related Art

As demand for electric vehicles increases worldwide, demand for equipment for batteries to be mounted on electric vehicles also increases.

The electric vehicle uses a battery in which a plurality of rechargeable cells capable of charging and discharging are combined into a pack as a primary power source, and accordingly provides an advantage of no exhaust gas and very little noise.

In a battery applied to such an electric vehicle, a battery module assembly is formed by stacking a plurality of battery cells, and a battery pack assembly in which a plurality of battery module assemblies are electrically connected is mounted on the vehicle.

Various electrical components (e.g., PCB, BMS, busbar, clamp, or the like) are mounted in the battery module assembly, and these electrical components are coupled to the battery module through a welding process.

In a conventional welding process, welding facility is installed at each portion where the electric components are welded to battery module assemblies along a conveyor on which battery module assemblies are transported in one direction (or arranged in series). Therefore, since an expensive oscillator must be provided for each welding facility, there is a problem in that a lot of cost is required to build the welding facility.

In addition, due to the characteristic that battery module assemblies are transported in series along the conveyor, when a failure occurs in any one welding facility among a plurality of welding facilities disposed along the conveyor, or when the welding facility is to be cleaned, a problem may arise in that the operation of all welding facilities disposed along the conveyor must be stopped.

The above information disclosed in this Background section is only for enhancement of understanding of the background of the disclosure, and therefore it may contain information that does not form the prior art that is already known to a person of ordinary skill in the art.

SUMMARY

The present disclosure provides a clamping jig for a battery module assembly and a welding system including the same, capable of shortening cycle time of the welding process and increasing the operation rate.

In one embodiment of the present disclosure, the clamping jig may include: a support base movably provided in a conveyor, a central base on which the battery module assembly is seated in an upper portion of the support base, at least one front jig configured to pressurize and support the battery module assembly seated on the central base from a front side, and at least one rear jig configured to pressurize and support the battery module assembly seated on the central base from a rear side. The clamping jig may further include: at least one left-side jig configured to pressurize and support the battery module assembly seated on the central base from a left side, at least one right-side jig configured to pressurize and support the battery module assembly seated on the central base from a right side, and at least one backup jig configured to support between a sensing board and a cell stack of the battery module assembly seated on the central base. In particular, the front jig, the rear jig, the left-side jig, the right-side jig, and the backup jig are movably provided according to a predetermined sequence.

In another embodiment, the front jig may include a front jig main body movably provided on the support base, a welding cartridge provided between the front jig main body and the battery module assembly, an elastic member provided in the front jig main body, and configured to provide elastic force to the welding cartridge, and an insulation member provided between the welding cartridge and the elastic member.

In one embodiment, the clamping jig may further include a spatter receiver provided to surround an outer boundary of the welding cartridge and configured to collect a spatter.

In one embodiment, the clamping jig may further include a dust collector provided in a rear side of the welding cartridge and configured to intake fume.

The rear jig may be provided to face the front jig and formed in a symmetrical shape.

In one embodiment, the left-side jig may include a left-side jig main body movably provided on the support base, a welding cartridge provided between the left-side jig main body and the battery module assembly, an elastic member provided in the left-side jig main body, and configured to provide elastic force to the welding cartridge, an insulation member provided between the welding cartridge and the elastic member, and a clamping jig protruding from the left-side jig main body toward the battery module assembly.

In one embodiment, the clamping jig may further include an air curtain configured to inject air to a welding hole, where the welding hole is formed in the clamping jig.

In one embodiment, the clamping jig may further include a spatter receiver provided in a lower portion of the clamping jig and configured to collect spatter.

In one embodiment, the clamping jig may further include a jig extension portion protruding from the left-side jig main body toward the battery module assembly. In another embodiment, a positioning hole or a positioning pin is formed in an end portion of the jig extension portion, and a pocket hole is formed in a lower portion of the jig extension portion.

The right-side jig may be provided to face the left-side jig and formed in a symmetrical shape.

In one embodiment, moving speeds of the left-side jig and the right-side jig, and pressurizing forces of the battery module assembly by the left-side jig and the right-side jig may be set to be different from each other.

In one embodiment, the welding cartridge may include an upper supporting portion, a lower supporting portion, and a connection supporting portion configured to connect the upper supporting portion and the lower supporting portion and being formed with a connection opening.

In one embodiment, the clamping jig may further include an air inlet formed in the upper supporting portion and configured to receive air, an air outlet formed in the connection supporting portion and configured to inject air, and an air passage formed in the upper supporting portion and the connection supporting portion and configured to provide communication between the air inlet and the air outlet.

In one embodiment, a cross-section of the connection opening may be formed to become narrower toward the battery module assembly.

The elastic member may be provided between the upper supporting portion and a front jig main body, and between the lower supporting portion and the front jig main body, respectively.

The backup jig may include a backup jig main body movably provided on the support base, and at least one backup guide pin extending upward from the backup jig main body.

The backup jig may be provided in a quantity of two, and the two backup jigs may be provided to face each other, and formed in a symmetrical shape.

The front jig and the rear jig may be provided in a plural quantity to be movable in a predetermined direction, respectively, and the front jig and the rear jig are replaceable depending on specification of the battery module assembly.

The left-side jig and the right-side jig may be provided in a plural quantity to be movable in a predetermined direction, respectively, and the left-side jig and the right-side jig are replaceable depending on specification of the battery module assembly.

In one embodiment, a welding system may include the clamping jig as above, two conveyors configured to transport the clamping jig, and two welding robots disposed adjacent to the two conveyors, respectively, where, while a battery module assembly seated on the clamping jig is welded by the welding robot at a welding position of a first one conveyor among the two conveyors, the battery module assembly at a waiting position of a second one conveyor among the two conveyors is clamped by the clamping jig.

According to the clamping jig and the welding system including the clamping jig according to the present disclosure, the cycle time of the welding process may be minimized through structural improvement of the welding cartridge.

In addition, the lead time and cycle time of the welding process may be minimized by sequentially performing the clamping process and the welding process of the battery module assembly through two conveyors.

Other effects that may be obtained or are predicted by embodiments of the present disclosure are explicitly or implicitly described in a detailed description of the present disclosure. Various exemplary effects that are predicted according to the embodiments are described in the following detailed description.

BRIEF DESCRIPTION OF THE DRAWINGS

These drawings are for reference only in describing embodiments of the present disclosure, and therefore the technical idea of the present disclosure should not be limited to the accompanying drawings.

Figure 1:
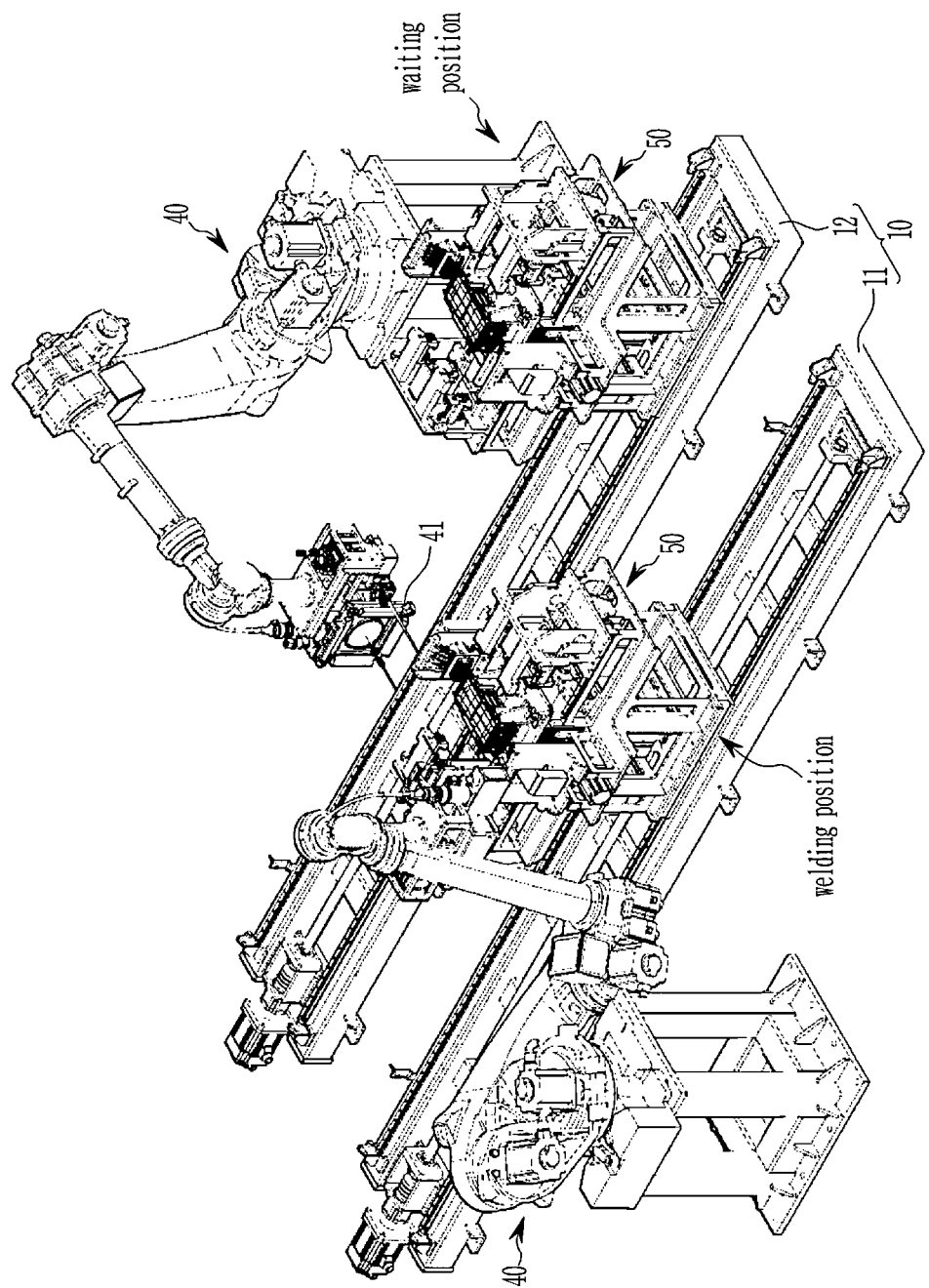
FIG. 1 is a perspective view showing a configuration of a welding system according to an embodiment.

It should be understood that the above-referenced drawings are not necessarily to scale, presenting a somewhat simplified representation of various features illustrative of the basic principles of the disclosure. The specific design features of the present disclosure, including, for example, specific dimensions, orientations, locations, and shapes, should be determined in part by the particular intended application and use environment.

DETAILED DESCRIPTION

The terminology used herein is for the purpose of describing particular embodiments only and is not intended to be limiting of the present disclosure. As used herein, the singular forms are intended to include the plural forms as well, unless the context clearly indicates otherwise. It should be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any one or all combinations of one or more related items.

The present disclosure is described hereinafter with reference to the accompanying drawings, in which embodiments of the disclosure are shown. As those having ordinary skill in the art would realize, the described embodiments may be modified in various different ways, all without departing from the spirit or scope of the present disclosure.

In order to clearly describe the present disclosure, parts that are irrelevant to the description are omitted, and identical or similar constituent elements throughout the specification are denoted by the same reference numerals.

In addition, since the size and thickness of each configuration shown in the drawings are arbitrarily shown for convenience of description, the present disclosure is not necessarily limited to configurations illustrated in the drawings, and in order to clearly illustrate several parts and areas, enlarged thicknesses are shown.

The terms "module" and "unit" for components used in the following description are used only in order to make the specification easier. Therefore, these terms do not have meanings or roles that distinguish them from each other by themselves. When a component, device, element, or the like of the present disclosure is described as having a purpose or performing an operation, function, or the like, the component, device, or element should be considered herein as being "configured to" meet that purpose or to perform that operation or function.

In describing embodiments of the present disclosure, when it is determined that a detailed description of the well-known art associated with the present disclosure may obscure the gist of the present disclosure, it has been omitted.

The accompanying drawings are provided only in order to allow embodiments disclosed in the present specification to be easily understood and are not to be interpreted as limiting the spirit disclosed in the present specification, and it is to be understood that the present disclosure includes all modifications, equivalents, and substitutions without departing from the scope and spirit of the present disclosure.

Hereinafter, a welding system according to embodiments of the present disclosure is described in detail with reference to the accompanying drawings.

FIG. 1 is a perspective view showing a configuration of a welding system according to the embodiment. In addition, FIG. 2 is a perspective view showing a configuration of a battery module assembly 20 according to an embodiment.

Figure 2:
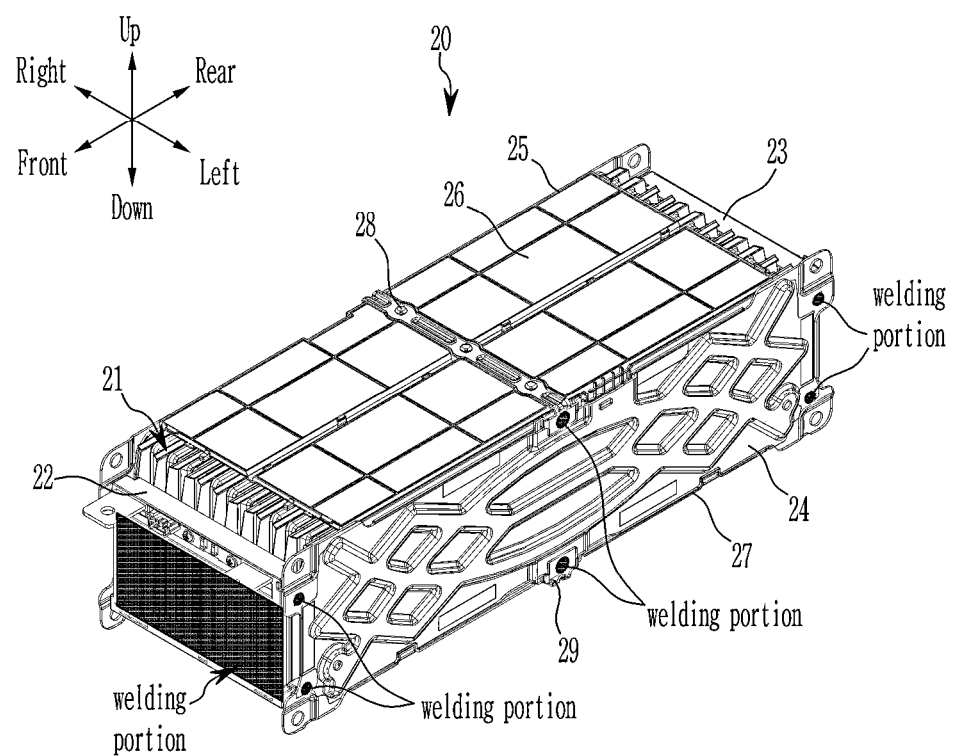
FIG. 2 is a perspective view showing a configuration of a battery module assembly according to an embodiment.

As shown in FIG. 1 and FIG. 2, the welding system may include at least two conveyors 10 configured to transport the battery module assembly (BMA) 20 which is a welding object; a clamping jig 50 configured to clamp and unclamp the battery module assembly 20; and at least two welding robots 40 configured to weld the battery module assembly 20. In the embodiment, the welding object may be the battery module assembly 20, but the welding object of the welding system of the present disclosure is not limited to the battery module assembly 20. For example, the welding object may be a hairpin type stator coil applied to a driving motor of an electric vehicle. In the present disclosure, the welding object and the battery module assembly 20 may be used interchangeably, if necessary.

The battery module assembly 20 may include a cell stack 21 including a plurality of battery cells, a sensing board provided at a front side and a rear side of the cell stack 21 respectively, and a left-side end plate 24 provided on a left side of the cell stack 21. The battery module assembly 20 may further include a right-side end plate 25 provided on a right side of the cell stack 21, and an upper cover 26 provided in an upper portion of the cell stack 21. The battery module assembly 20 may further include a lower cover 27 provided in a lower portion of the cell stack 21, and an upper clamp 28 and a lower clamp 29 configured to fix both sides of the left-side end plate 24 and the right-side end plate 25.

In an embodiment, ten welding portions for welding an electrode lead of a battery cell and a front sensing board 22 to a front side of the battery module assembly 20 may exist. In an embodiment, ten welding portions for welding an electrode lead of a battery cell and a rear sensing board 23 to a rear side of the battery module assembly 20 may exist. In an embodiment, four welding portions for welding an electrode lead of a battery cell and the front sensing board 22 to a left side of the battery module assembly 20 and two welding portions for welding upper and lower clamps 29 and the left-side end plate 24 may exist, and four welding portions for welding an electrode lead of a battery cell and the front sensing board 22 to a right side of the battery module assembly 20 and two welding portions for welding the upper and lower clamps 29 and the right-side end plate 25 may exist.

Therefore, ten welding portions may exist on the front side of the battery module assembly 20, ten welding portions may exist on the rear side of the battery module assembly 20, six welding portions may exist on a left surface of the battery module assembly 20, and six welding portions may exist on a right surface of the battery module assembly 20.

The two conveyors 10 transport the battery module assembly 20 to a predetermined direction in order to perform a predetermined work process (for example, a stacking process, an assembly process, a welding process, and the like of the battery cell). The two conveyors 10 include a first conveyor 11 and a second conveyor 12, and they are disposed in parallel to each other. At this time, the battery module assembly 20 is transported by a conveyor 10 in a state mounted on a battery pallet 30. Hereinafter, for convenience of description, the battery pallet 30 may be in a state of mounting the battery module assembly 20.

The battery pallet 30 is formed in a generally plate shape, on which the battery module assembly 20 (i.e., the welding object) is seated. The battery pallet 30 is seated on a support pad 53 of a central base 52 of a clamping jig 50. A support hole 31 is formed at corners in a diagonal direction of the battery pallet 30, and a support protrusion 54 of the central base 52 of the clamping jig 50 is inserted into the support hole 31. A backup hole 33 is formed at both sides of the battery pallet 30 in a front-and-rear direction, and a front-side backup guide pin 520 of a front backup jig 500 penetrates the backup hole 33.

The clamping jig 50 is configured to clamp (or, fix) the battery pallet 30 seated on the conveyor 10. The configuration of the clamping jig 50 is described in detail below.

At least two welding robots 40 are provided adjacent to the two conveyors 10. The two welding robots 40 include a first welding robot disposed adjacent to the first conveyor 11, and a second welding robot disposed adjacent to the second conveyor 12.

The welding robots 40 weld the battery module assembly 20 of the battery pallet 30 seated on the clamping jig 50, through the welder 41 mounted at the end. To this end, the welding robots 40 may be implemented as a 6-axis articulated robot. The welding robots 40 may be implemented as the 6-axis articulated robot, and may weld front, rear, left, and right surfaces of the battery module assembly 20.

Hereinafter, the configuration of the clamping jig according to the present disclosure is described in detail with reference to the accompanying drawings.

Figure 3:
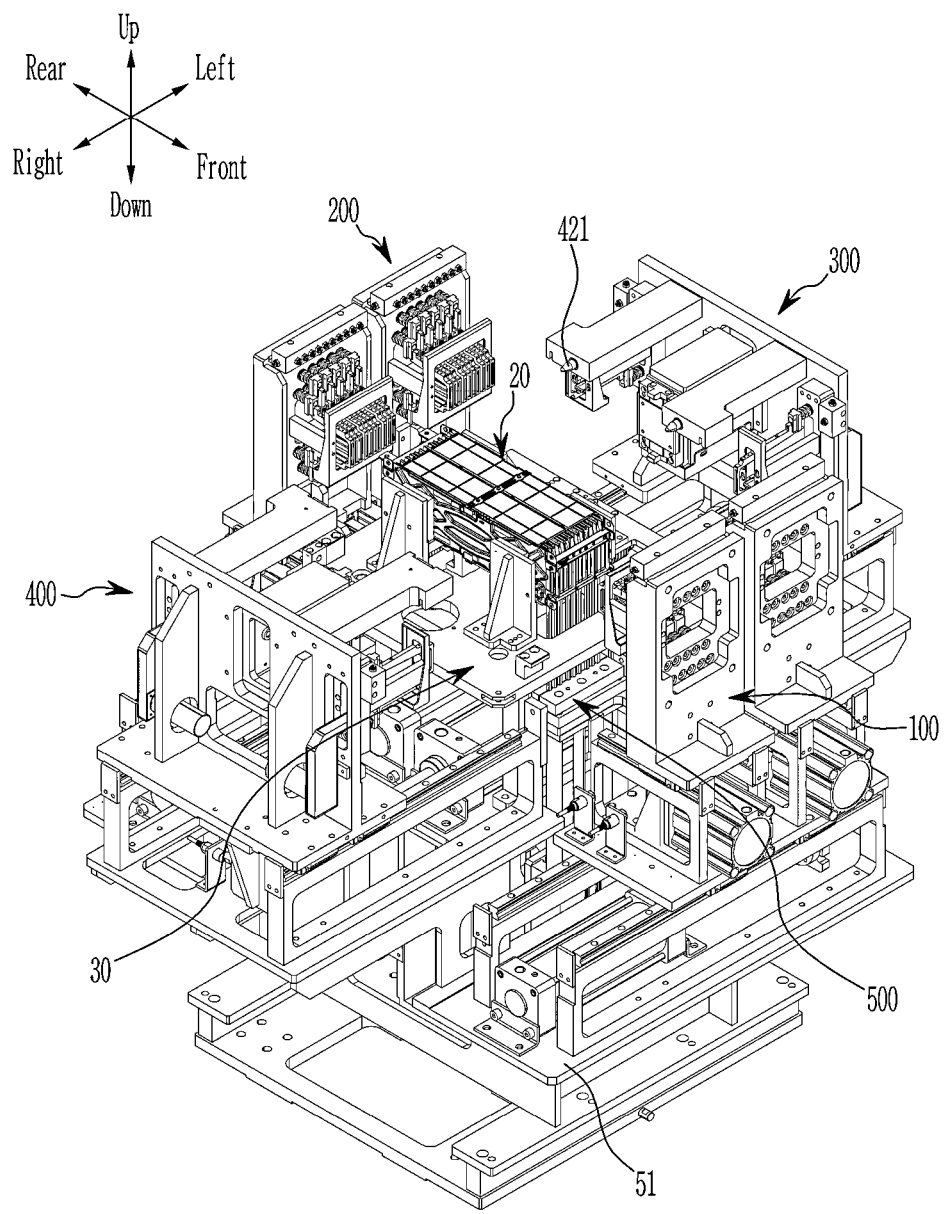
FIG. 3 is a perspective view showing a configuration of a clamping jig according to an embodiment.

FIG. 3 is a perspective view showing a configuration of a clamping jig according to an embodiment. In addition, FIG. 4 is an exploded perspective view showing a configuration of a clamping jig according to an embodiment.

Figure 4:
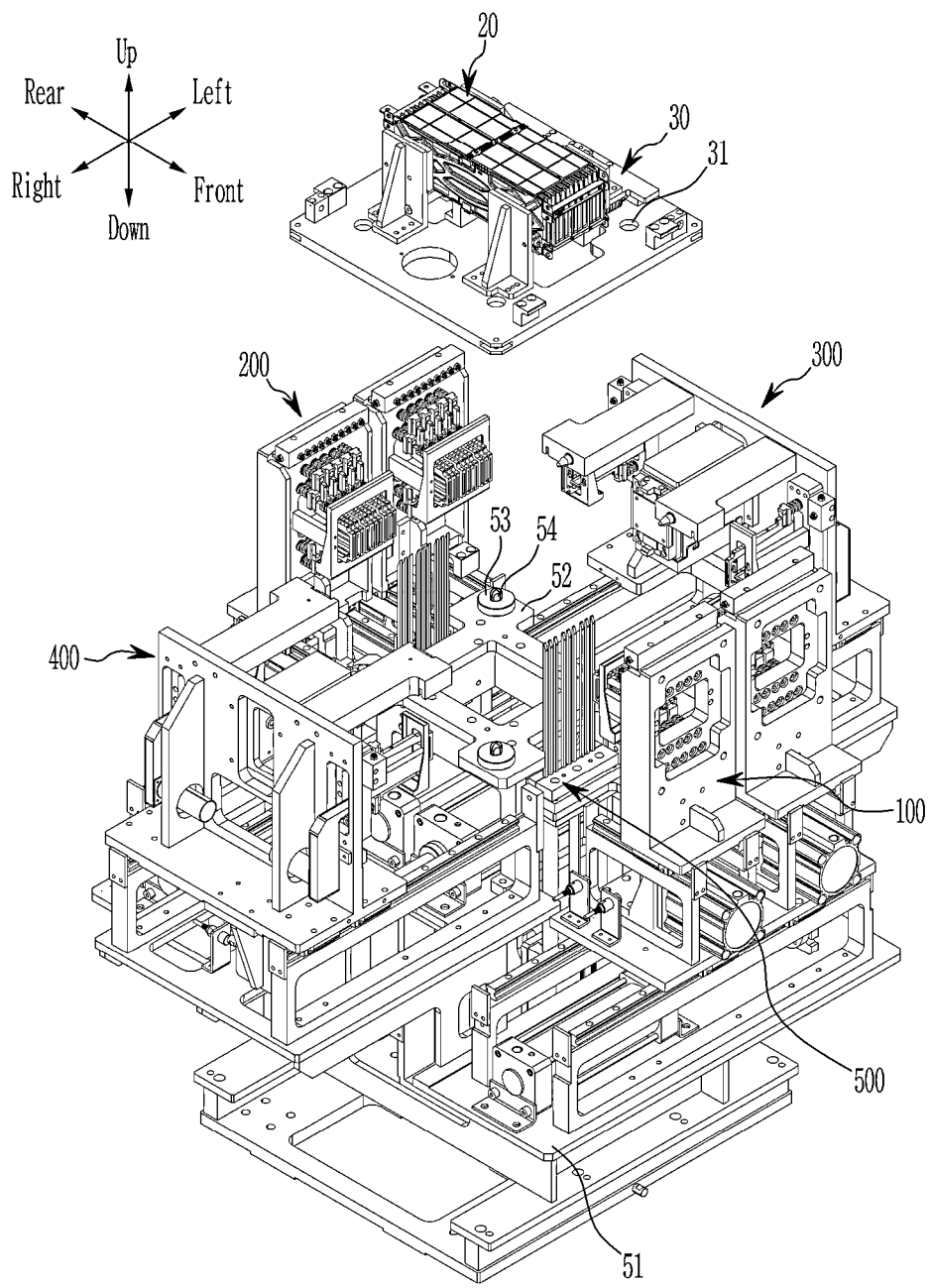
FIG. 4 is an exploded perspective view showing a configuration of a clamping jig according to an embodiment.

As shown in FIG. 3 and FIG. 4, the clamping jig 50 may include a support base 51 seated on the conveyor 10, the central base 52 positioned in a central upper portion of the support base 51, a front jig 100 provided in a front side of the central base 52, and a rear jig 200 provided in a rear side of the central base 52. The clamping jig 50 may further include a left-side jig 300 provided in a left side of the central base 52, a right-side jig 400 provided in a right side of the central base 52, and the front backup jig 500 provided between the central base 52 and the front jig 100 and the rear jig 200. The front jig 100, the rear jig 200, the left-side jig 300, the right-side jig 400, the front backup jig 500, and a rear backup jig 600 of the clamping jig 50 are movably provided according to a predetermined sequence.

The support base 51 of the clamping jig 50 is seated on the conveyor 10, and the clamping jig 50 moves along the conveyor 10.

The central base 52 of the clamping jig 50 is formed in a generally plate shape, and the battery pallet 30, which is the welding object, is seated on the central base 52.

The front jig 100 is positioned in a front side of the welding object on the support base 51, and movable in the front-and-rear direction toward the battery pallet 30. In addition, the rear jig 200 is positioned in a rear side of the welding object on the support base 51, and movable in the front-and-rear direction toward the battery pallet 30. The front jig 100 is configured to pressurize and support a battery module assembly 10 seated on the battery pallet 30 from a front side, and the rear jig 200 is configured to pressurize and support the battery module assembly 10 seated on the battery pallet 30 from a rear side. In other words, the front jig 100 and the rear jig 200 cooperate to pressurize and support the battery module assembly 10 in the front-and-rear direction.

The front jig 100 and the rear jig 200 are disposed to face each other with respect to the welding object, and formed in a symmetrical shape to each other. In one form, the front jig 100 and the rear jig 200 have substantially a same shape.

The left-side jig 300 is positioned in a left side of the welding object on the support base 51, and movable in a left-and-right direction toward the battery pallet 30. In addition, the right-side jig 400 is positioned in a right side of the welding object on the support base 51, and movable in the left-and-right direction toward the battery pallet 30. The left-side jig 300 is configured to pressurize and support the battery module assembly 10 from a left side, and the right-side jig 400 is configured to pressurize and support the battery module assembly 10 from a right side. In other words, the left-side jig 300 and the right-side jig 400 cooperate to pressurize and support the battery module assembly 10 in the left-and-right direction.

The left-side jig 300 and the right-side jig 400 are disposed to face each other with respect to the welding object, and formed in a symmetrical shape to each other. In one embodiment, the left-side jig 300 and the right-side jig 400 have substantially a same shape.

Figure 5:
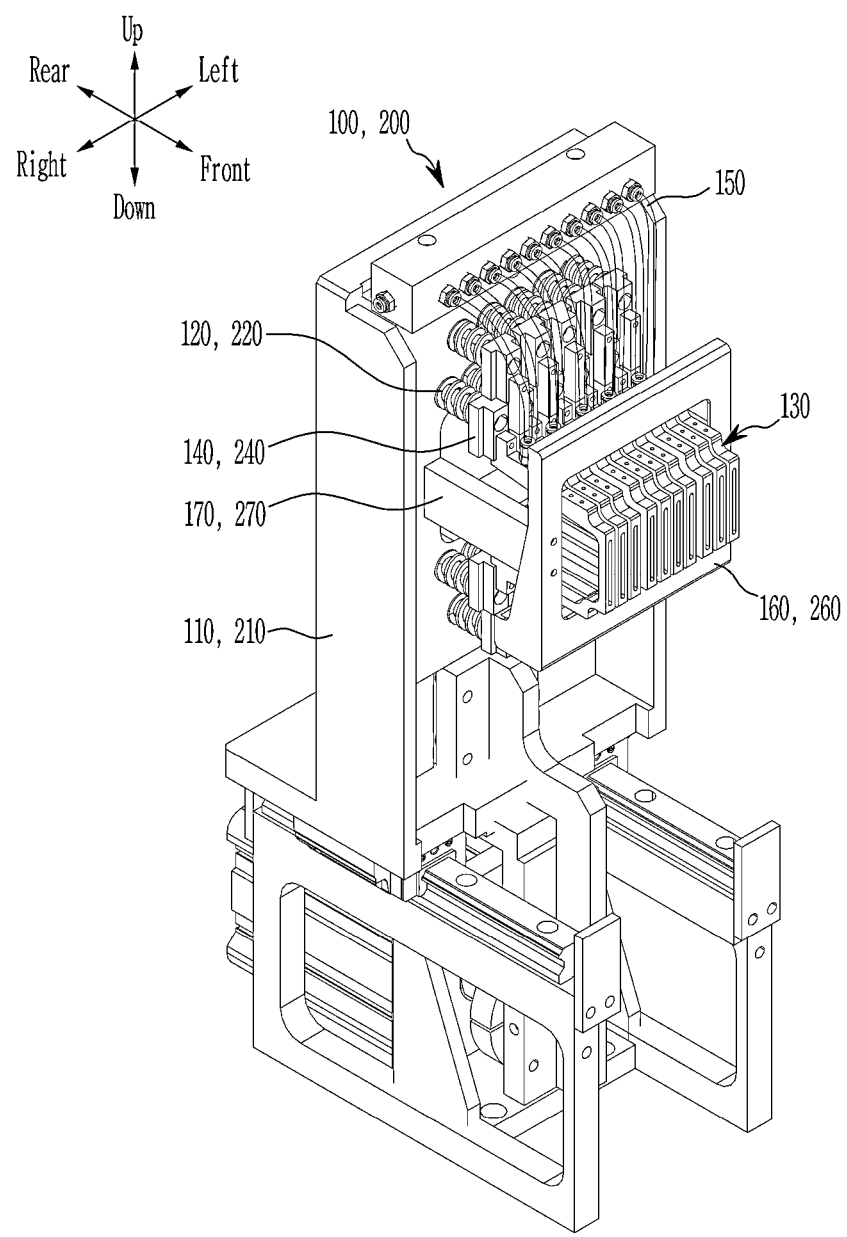
FIG. 5 is a perspective view showing a configuration of a front jig according to an embodiment.

Referring to FIG. 5, the front jig 100 may include a front jig main body 110, and a welding cartridge 130 elastically provided between the front jig main body 110 and the welding object. The front jig 100 may further include a front elastic member 120 configured to apply an elastic force to the welding cartridge 130 between the front jig main body 110 and the welding cartridge 130. The front jig 100 may further include a front insulation member 140 configured to provide insulation between the front jig main body 110 and the welding cartridge 130.

The front jig main body 110 is movably provided on the support base 51 of the clamping jig 50, and may move toward the battery pallet 30, or move away from the battery pallet 30 by the power of a driving portion (for example, an electric motor, or a hydraulic device). The front jig 100 may move in the front-and-rear direction toward the battery pallet 30 according to a movement of the front jig main body 110.

The welding cartridge 130 is provided between the front jig main body 110 and the welding object, and selectively contact the welding object according to a movement of the front jig 100. The welding cartridge 130 is floated from the front jig main body 110 by the elastic force of the front elastic member 120. The detailed configuration of the welding cartridge 130 is described below.

The front insulation member 140 provides insulation between the front jig main body 110 and the welding cartridge 130. To this end, the front insulating member 140 may be made of a bakelite material. A first side of the front insulation member 140 may be connected to the front elastic member 120, and a second side may be connected to the welding cartridge 130.

The front elastic member 120 is provided in an upper portion and a lower portion of the welding cartridge 130, respectively, and configured to apply an elastic force to the welding cartridge 130. By the elastic force of the front elastic member 120, the welding cartridge 130 is floated from the front jig main body 110, and when the front jig 100 move toward the welding object, the welding cartridge 130 may be stably in surface contact with a welding surface of the welding object. A first side of the front elastic member 120 may be supported by an inner side surface of the front jig main body 110, and a second side may be supported by the front insulation member 140. The front elastic member 120 may be a coil spring.

The front jig 100 according to an embodiment may further include a front spatter receiver 160 configured to collect spatter generated by the welder of the welding robot 40. The front spatter receiver 160 may be formed in a generally rectangular block shape having a hollow center so as to surround an outer boundary of the welding cartridge 130.

In addition, the front jig 100 according to an embodiment may further include a front dust collector 170 configured to draw fume generated by the welder of the welding robot 40. The front dust collector 170 may be provided in an inner lower portion of the welding cartridge 130.

Figure 6:
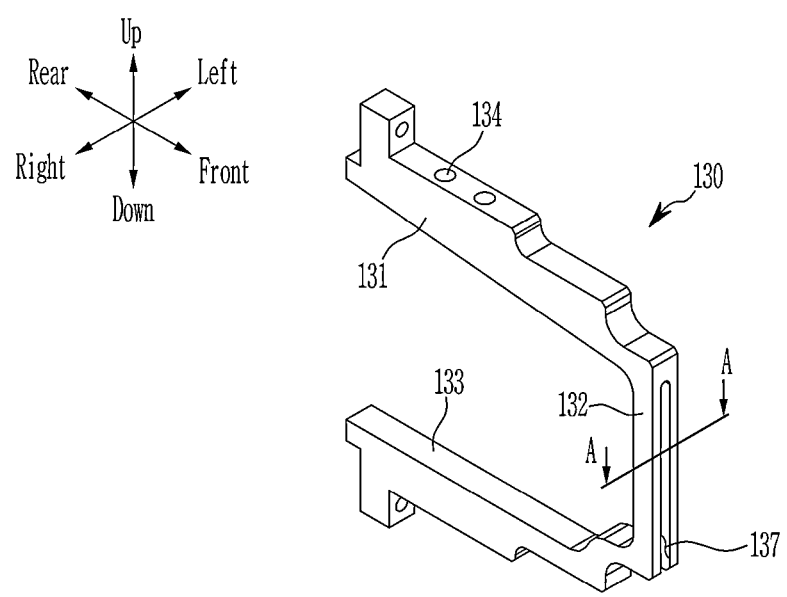
FIG. 6 is a perspective view showing a configuration of a welding cartridge according to an embodiment.
Figure 7:
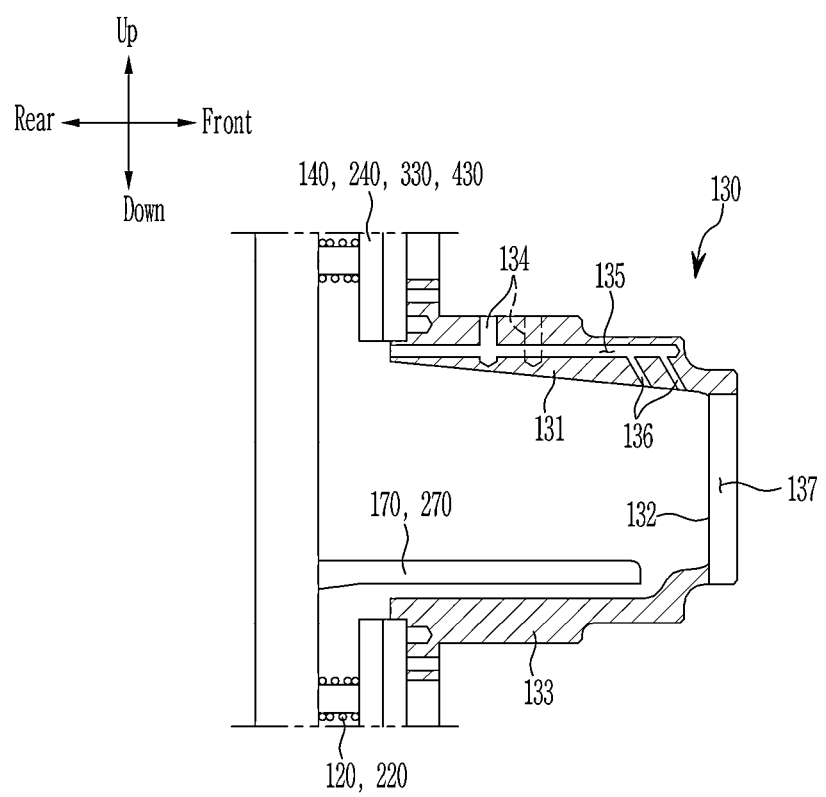
FIG. 7 is a cross-sectional view showing a partial configuration of a front jig including a welding cartridge according to an embodiment.

Referring to FIG. 6 and FIG. 7, the welding cartridge 130 may be formed in a generally U-shape, and may include an upper supporting portion 131, a lower supporting portion 133, and a connection supporting portion 132 configured to connect the upper supporting portion 131 and the lower supporting portion 133.

An air inlet 134 through which air is drawn is formed in an upper portion of the upper supporting portion 131, and an air outlet 136 through which the air drawn through the inlet is injected is formed in an upper portion of the connection supporting portion 132. An air passage 135 configured to provide communication between the air inlet 134 and the air outlet 136 is formed inside the upper supporting portion 131 and the connection supporting portion 132. In addition, an air pipe 150 connected to an air pump (not shown) is connected to the air inlet 134 of the upper supporting portion 131.

The connection supporting portion 132 is formed in a generally rectangular pillar shape with a long length, and a connection opening 137 lengthy in a vertical direction is formed at a center of the connection supporting portion 132. A laser is emitted to the welding object by the welder of the welding robot 40 through the connection opening 137.

Figure 8:
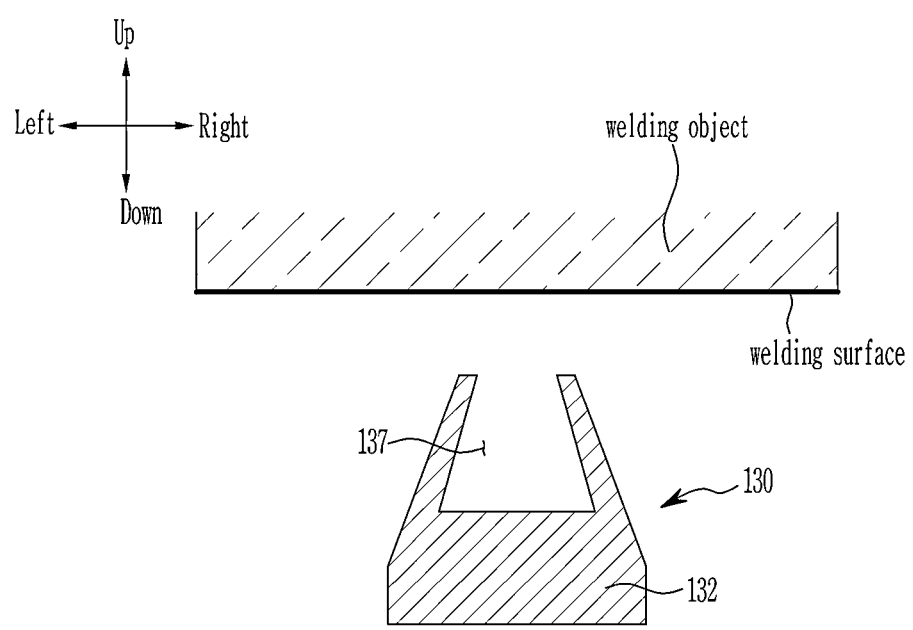
FIG. 8 is a cross-sectional view taken along line A-A of FIG. 6.

Referring to FIG. 8, a cross-section of the connection opening 137 is formed in a rhombus shape that becomes narrower toward the welding object. In other words, a width of the connection opening 137 in the left-and-right direction may be formed to become narrower toward the welding object.

When the air pumped from the air pump flows into the air inlet 134 through the air pipe 150, the air introduced through the air inlet 134 is injected into the air outlet 136 through the air pipe 135, and the air injected through the air outlet 136 along both inner surfaces of the connection opening 137 is directly injected around the welding object.

Figure 9:
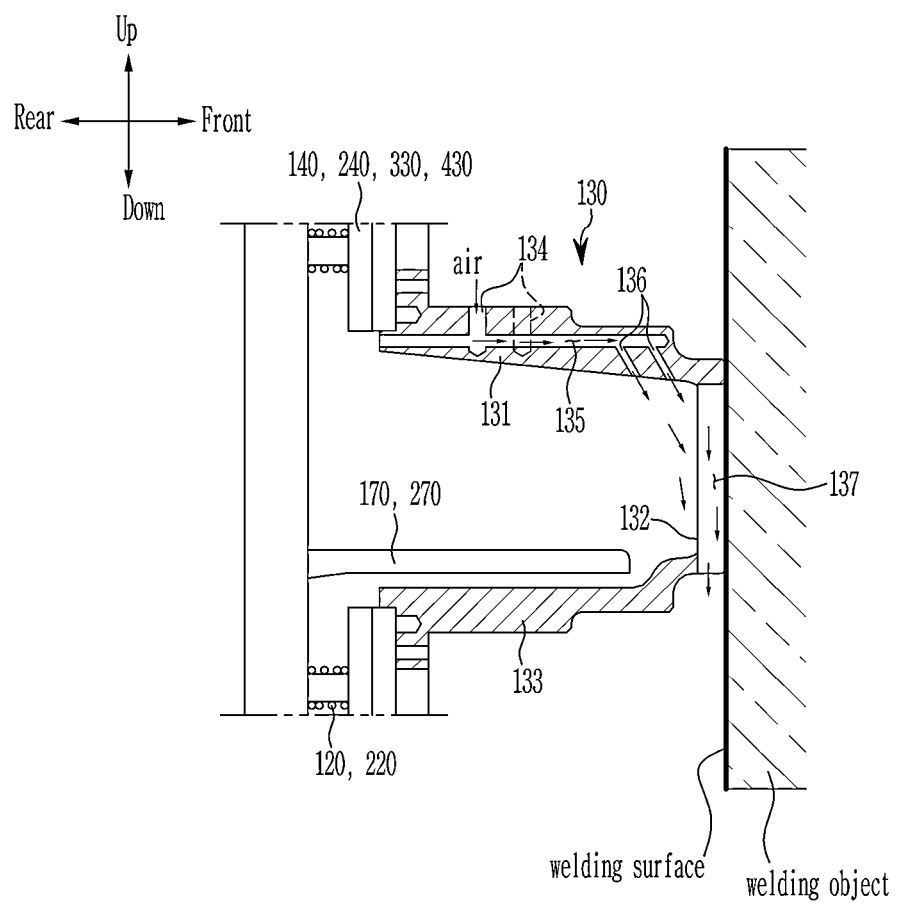
FIG. 9 is a view illustrating a process of injecting air through a welding cartridge according to an embodiment.

As such, the air for forming the welding atmosphere of the welding object is directly injected to the welding object through the air pipe 135 and the connection opening 137 of the welding cartridge 130, such that the laser emitted by the welder 41 of the welding robot 40 is prevented from being scattered by the spatter and/or fume, and the cooling efficiency and welding quality of the welding object is enhanced (refer to FIG. 9). Conventionally, in order to remove fume and/or spatter generated during the welding process, nitrogen gas was indirectly sprayed onto the welding object. However, since air may be injected to the welding object in the shortest distance through the welding cartridge 130 of the present disclosure, various facilities for spraying nitrogen may be reduced, and through this, energy required for the welding process may be reduced.

Figure 10:
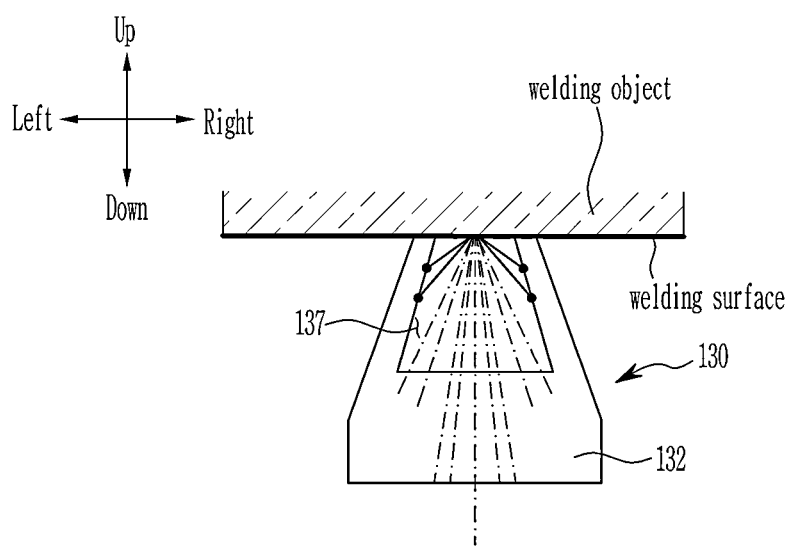
FIG. 10 and FIG. 11 are drawings showing a state in which laser is emitted through a welding cartridge according to an embodiment.

In addition, the laser emitted by the welder of the welding robot 40 is irradiated to the welding object through the connection opening 137, and since the cross-section of the connection opening 137 has a width in a rhombus shape that becomes narrower toward the welding object, the laser emitted from the welder may be prevented from colliding both inner side surfaces of the connection opening 137 (refer to FIG. 10).

Figure 11:
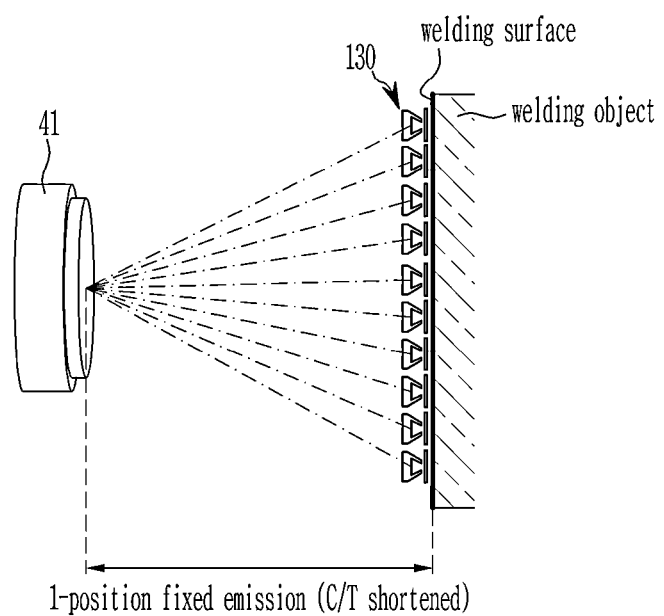

In addition, the laser emitted by the welder is prevented from colliding both inner side surfaces of the connection opening 137 by the shape of the connection opening 137, and the field of view (FOV) of the laser emitted by the welder may be set to be large. Therefore, the laser may be irradiated to the welding object at one position without moving the welder, and through this, the cycle time may be shortened, and the contamination of the welding cartridge 130 by the spatter generated during welding may be prevented (refer to FIG. 11).

The rear jig 200 may include a rear jig main body 210, the welding cartridge 130 elastically provided between the rear jig main body 210 and the welding object, a rear elastic member 220 configured to apply an elastic force to the welding cartridge 130 between the rear jig main body 210 and the welding cartridge 130, and a rear insulation member 240 configured to provide insulation between the rear jig main body 210 and the welding cartridge 130.

In addition, the rear jig 200 may further include a rear spatter receiver 260 configured to collect spatter, and a rear dust collector 270 for intaking fume.

In the present disclosure, since the rear jig 200 is provided to face the front jig 100 and is formed in a symmetrical shape with each other, the configuration of the rear jig 200 is substantially the same as that of the front jig 100. Therefore, a detailed description of each component constituting the rear jig 200 has been omitted.

Figure 12:
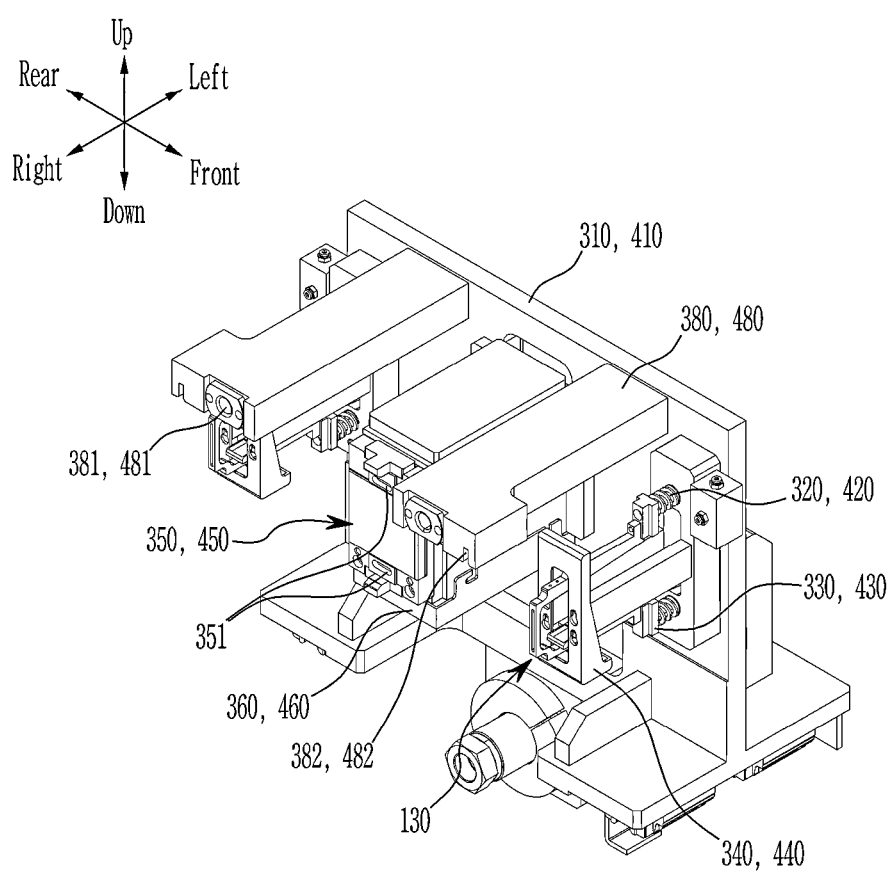
FIG. 12 and FIG. 13 are perspective views showing a configuration of a left-side jig of a welding system according to an embodiment.
Figure 13:
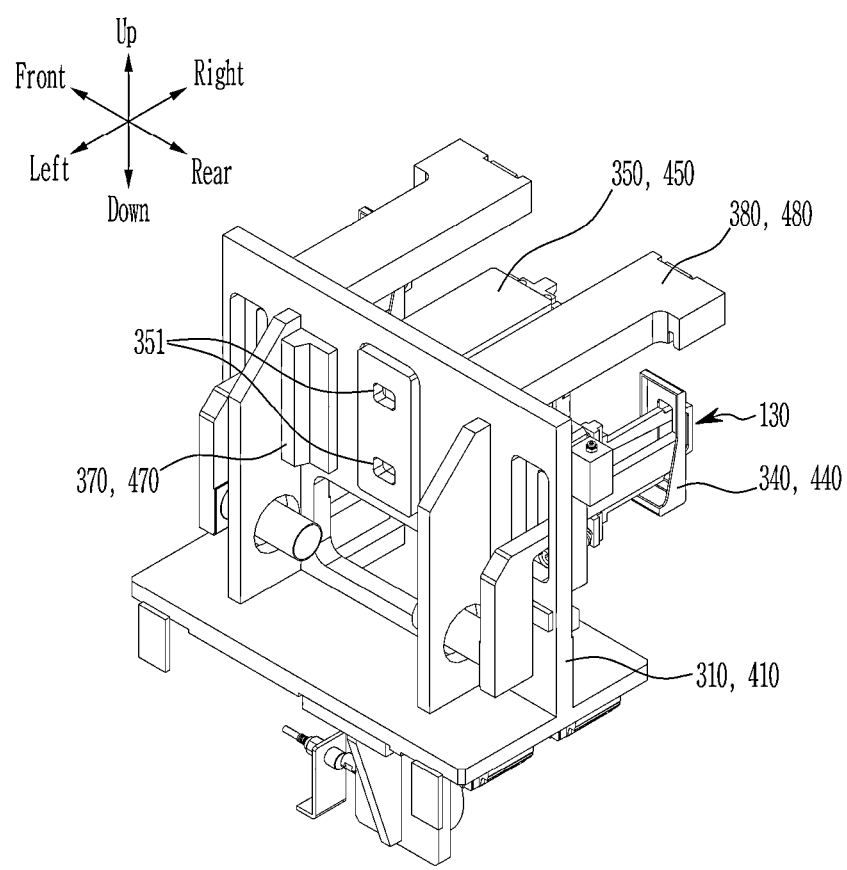

FIG. 12 and FIG. 13 are perspective view showing a configuration of a left-side jig of a welding system according to an embodiment.

As shown in FIG. 12 and FIG. 13, the left-side jig 300 may include a left-side jig main body 310, the welding cartridge 130 elastically provided between the left-side jig main body 310 and the welding object, a left-side elastic member 320 configured to apply an elastic force to the welding cartridge 130 between the left-side jig main body 310 and the welding cartridge 130, and a left-side insulation member 330 configured to provide insulation between the left-side jig main body 310 and the welding cartridge 130.

The left-side jig main body 310 is movably provided on the support base 51 of the clamping jig 50, and may move toward the battery pallet 30, or move away from the battery pallet 30 by the power of a driving portion (for example, an electric motor, or a hydraulic device).

At least one left-side jig extension portion 380 protruding toward the welding object may be formed in an upper portion of the left-side jig main body 310. In one embodiment, the left-side jig extension portion 380 may be formed in a quantity of two. The left-side jig extension portion 380 may be formed in a substantially long rectangular block shape. A positioning hole 381 is formed at an end portion of the left-side jig extension portion 380 facing the right-side jig main body 410. In addition, a left-side pocket hole 382 is formed at a lower end of the left-side jig extension portion 380. A front-side backup guide pin 520 of a left-side front backup jig 500 (described below) is inserted into the left-side pocket hole 382.

The welding cartridge 130 is provided between the left-side jig main body 310 and the welding object, and selectively contact the welding object according to a movement of the left-side jig 300. The welding cartridge 130 is floated from the left-side jig main body 310 by the elastic force of the left-side elastic member 320.

The welding cartridge 130, the left-side elastic member 320, and the left-side insulation member 330 have substantially the same structure as the welding cartridge 130, the front elastic member 120, and the front insulation member 140 of the above-described the front jig 100, and is not described in further detail. In one embodiment, the left-side jig 300 may be equipped with two welding cartridges 130.

The left-side jig 300 according to an embodiment may further include a left-side spatter receiver 340 configured to collect spatter generated by the welder of the welding robot 40. The left-side spatter receiver 340 may be formed in a generally rectangular block shape having a hollow center so as to surround an outer boundary of the welding cartridge 130.

In addition, the left-side jig 300 according to an embodiment may further include a left-side dust collector configured to draw fume generated by the welder of the welding robot 40. The left-side dust collector may be provided in the inner lower portion of the welding cartridge 130.

Between the two welding cartridges 130, a left-side clamping jig 350 is formed to protrude from the left-side jig main body 310 toward the central base 52 (alternatively, battery module assembly). The left-side clamping jig 350 is configured to pressurize and support a welding portion for welding the upper and lower clamps 29 and the left-side and right-side end plates 25 on a side surface of the battery module assembly 20. An end portion of the left-side clamping jig 350 may be formed of an elasticity material, if necessary. The left-side clamping jig 350 may be provided between a pair of welding cartridges 130. A welding hole 351 is formed in the left-side clamping jig 350. The laser emitted by the welder 41 of the welding robot 40 is irradiated to the welding object through the welding hole 351.

In one embodiment, a left center spatter receiver 360 configured to collect spatter generated by welding is provided at a lower portion of the left-side clamping jig 350. The spatter generated at the welding portion supported (or, pressurized) through the left-side clamping jig 350 is collected through the left center spatter receiver 360.

In addition, a left-side air curtain 370 configured to inject air toward the welding hole 351 of the left-side clamping jig 350 from a rear side of the left-side jig main body 310 may be provided. By injecting air to the welding portion supported (or, pressurized) through the left-side clamping jig 350, the left-side air curtain 370 may remove fume or spatter generated during the laser welding, and the quality of the laser welding may be enhanced.

The right-side jig 400 may include the right-side jig main body 410, the welding cartridge 130 elastically provided between the right-side jig main body 410 and the welding object, a right-side elastic member 420 configured to apply an elastic force to the welding cartridge 130 between the right-side jig main body 410 and the welding cartridge 130, and a right-side insulation member 430 configured to provide insulation between the right-side jig main body 410 and the welding cartridge 130.

At least one right-side jig extension portion 480 protruding toward the welding object may be formed at an upper portion of the right-side jig 400.

In addition, the right-side jig 400 may further include a right-side spatter receiver 440 configured to collect spatter, and right-side dust collector for intaking fume.

In addition, the right-side jig 400 may include a right-side clamping jig 450 protruding from the right-side jig main body 410 between the two welding cartridges 130, a right center spatter receiver 460 configured to collect spatter under the right-side clamping jig 450, and a right-side air curtain 470 configured to inject air toward the welding hole 351 of the right-side clamping jig 450 at a rear side of the right-side jig main body 410.

In the present disclosure, since the right-side jig 400 is provided to face the left-side jig 300 and formed in a symmetrical shape to each other, the configuration of the right-side jig 400 is substantially the same as that of the left-side jig 300. Therefore, a detailed description of each component constituting the right-side jig 400 has been omitted.

However, a positioning pin 481 may be formed at an end portion of a right-side extension portion of the right-side jig 400 corresponding to a left-side extension portion of the left-side jig 300. When the left-side jig 300 and the right-side jig 400 move toward the welding object, the positioning pin 481 of the right-side jig 400 is inserted into the positioning hole 381 of the left-side jig 300, and thus exact positions of the left-side jig 300 and the right-side jig 400 may be determined. The positioning hole 381 of the left-side jig 300 and the positioning pin 481 of the right-side jig 400 are complementary to each other.

Figure 14:
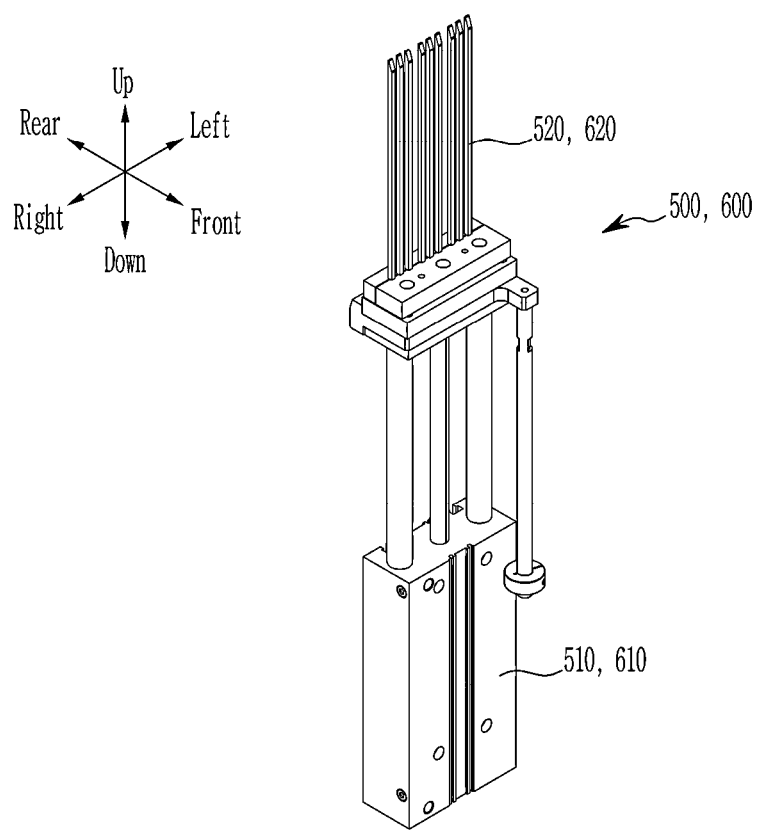
FIG. 14 is a perspective view showing a configuration of a front backup jig according to an embodiment.

Referring to FIG. 14, the front backup jig 500 may include a front backup jig main body 510, and at least one front-side backup guide pin 520 extending upward from the front backup jig main body 510.

The front backup jig main body 510 is provided on the support base 51 of the clamping jig 50 to be movable in the vertical direction, and may move toward the battery pallet 30, or move away from the battery pallet 30 in the vertical direction by the power of a driving portion (for example, an electric motor, or a hydraulic device).

The front-side backup guide pin 520 is inserted between the front sensing board 22 and the cell stack 21 in the front side of the battery module assembly 20, to prevent the sensing board from being deformed during the welding process.

The front-side backup guide pin 520 may be provided in a plural quantity. In the present disclosure, nine front-side backup guide pins 520 may be formed to be inserted between electrode leads of 10 battery cells.

The rear backup jig 600 may include a rear backup jig main body 610, and at least one rear-side backup guide pin 620 extending in the upward direction from the rear backup jig main body 610. The rear-side backup guide pin 620 is inserted between the rear sensing board 23 and the cell stack 21 in the rear side of the battery module assembly 20, to prevent the sensing board from being deformed during the welding process.

In the present disclosure, since the front backup jig 500 and the rear backup jig 600 are provided to face each other, and formed in a symmetrical shape to each other, the configuration of the rear backup jig 600 is substantially the same as that of the front backup jig 500. Therefore, a detailed description of each component constituting the rear backup jig 600 has been omitted.

Hereinafter, the welding process by the welding system including the clamping jig of the present disclosure and the operation of the clamping jig is described in detail with reference to the accompanying drawings.

FIG. 15A to FIG. 15D are views illustrating an operation of a clamping jig according to an embodiment.

Figure 15A:
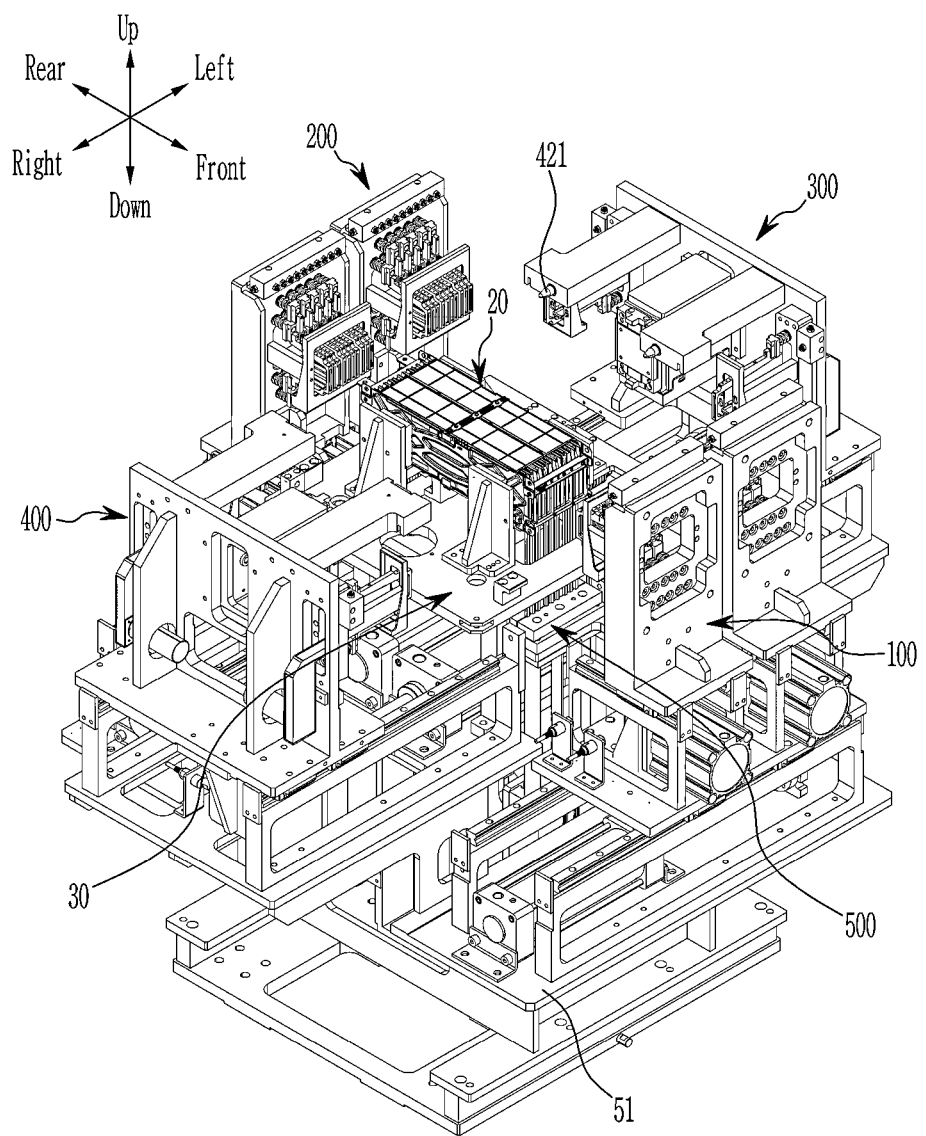
FIG. 15A to FIG. 15D are views showing an operation of a clamping jig according to an embodiment.

Referring to FIG. 15A, the battery pallet 30 is seated on the central base 52 of the clamping jig 50. At this time, the lower surface of the battery pallet 30 is seated on the support pad 53 of the central base 52, and accordingly, a position of the battery pallet 30 in the vertical direction is accurately determined. In addition, when the battery pallet 30 is seated on the central base 52, the support protrusion 54 of the central base 52 is inserted into the support hole 31 of the battery pallet 30. Accordingly, the position of the battery pallet 30 in the front-and-rear and left-and-right directions is accurately determined.

Figure 15B:
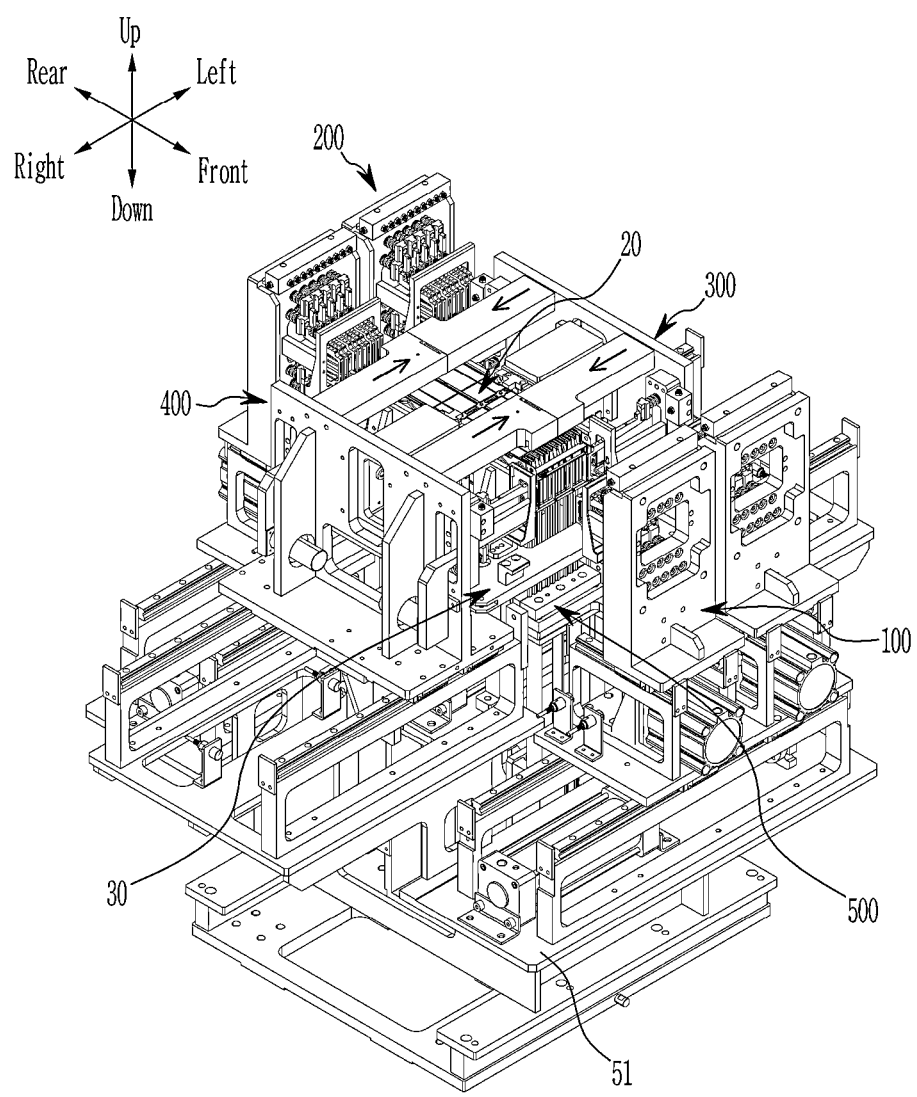

Referring to FIG. 15B, when the battery pallet 30 is accurately seated on the central base 52, the left-side jig 300 moves to the battery module assembly 20, which is the welding object, and the right-side jig 400 moves to the battery module assembly 20, which is the welding object. In addition, the left side and the right side of the battery module assembly 20, which is the welding object, are supported by the left-side jig 300 and the right-side jig 400, respectively.

At this time, the welding cartridge 130 of the left-side jig 300 contacts a left-side welding portion (left side periphery of the front sensing board 22 and the rear sensing board 23) of the battery module assembly 20, which is the welding object, and the welding cartridge 130 of the right-side jig 400 contacts right-side welding portion (right side periphery of the front sensing board 22 and the rear sensing board 23) of the battery module assembly 20, which is the welding object. At the same time, the end portion of the left-side clamping jig 350 of the left-side jig 300 contacts a left-side welding portion (around the left-side end plate 24 and the upper clamp 28, and the left-side end plate 24 and the lower clamp 29) of the battery module assembly 20, which is the welding object, and an end portion of the right-side clamping jig 450 of the right-side jig 400 contacts a right-side welding portion (around the right-side end plate 25 and the upper clamp 28, and the right-side end plate 25 and the lower clamp 29) of the battery module assembly 20, which is the welding object. Through this, the left side and the right side of the battery module assembly 20 pressurized and supported by the left-side jig 300 and the right-side jig 400.

When the left-side jig 300 and the right-side jig 400 move toward the battery module assembly 20, which is the welding object, the moving speed of the left-side jig 300 and the moving speed of the right-side jig 400, and pressurizing force of the battery module assembly 20 by the left-side jig 300 and the right-side jig 400 may be set differently.

For example, the left-side jig 300 may move to the battery module assembly 20 at a speed of 0.1 meters per second (m/s), and the right-side jig 400 may move to the battery module assembly 20 at a speed of 0.5 m/s. In addition, the left-side jig 300 may pressurize and support the left surface of the battery module assembly 20 with a pressure of 3 bar, and the right-side jig 400 may pressurize and support the right surface of the battery module assembly 20 with a pressure of 5 bar.

As such, by setting the moving speeds and pressurizing forces of the left-side jig 300 and the right-side jig 400 to be different, it is possible to accurately set the criterion in the left-and-right direction of the battery module assembly 20.

Figure 15C:
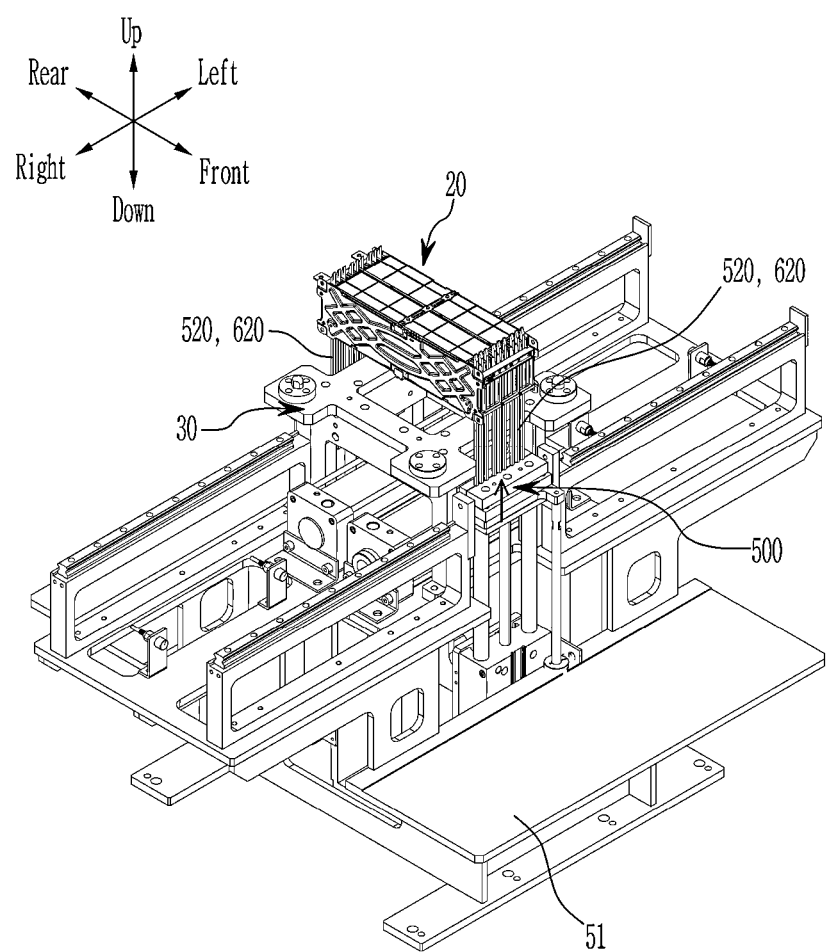

Referring to FIG. 15C, when the left-side jig 300 and the right-side jig 400 support the battery module assembly 20, the front backup jig 500 and the rear backup jig 600 move upward, a front guide pin of the front backup jig 500 is inserted between the front sensing board 22 and the cell stack 21, and a rear guide pin of the rear backup jig 600 is inserted between the rear sensing board 23 and the cell stack 21. At this time, the front guide pin and the rear guide pin penetrate between the front sensing board 22 and the cell stack 21, and then are inserted into and supported by a left-side pocket hole 322 formed in the left-side jig extension portion 380 of the left-side jig 300 and a right-side pocket hole 482 formed in the right-side jig extension portion 480 of the right-side jig 400, respectively. Through this, the front sensing board 22 and the rear sensing board 23 of the battery module assembly 20 are prevented from being deformed during the welding process, and the front guide pin and the rear guide pin are supported by the left-side pocket hole 322 and the right-side pocket hole 482.

Figure 15D:
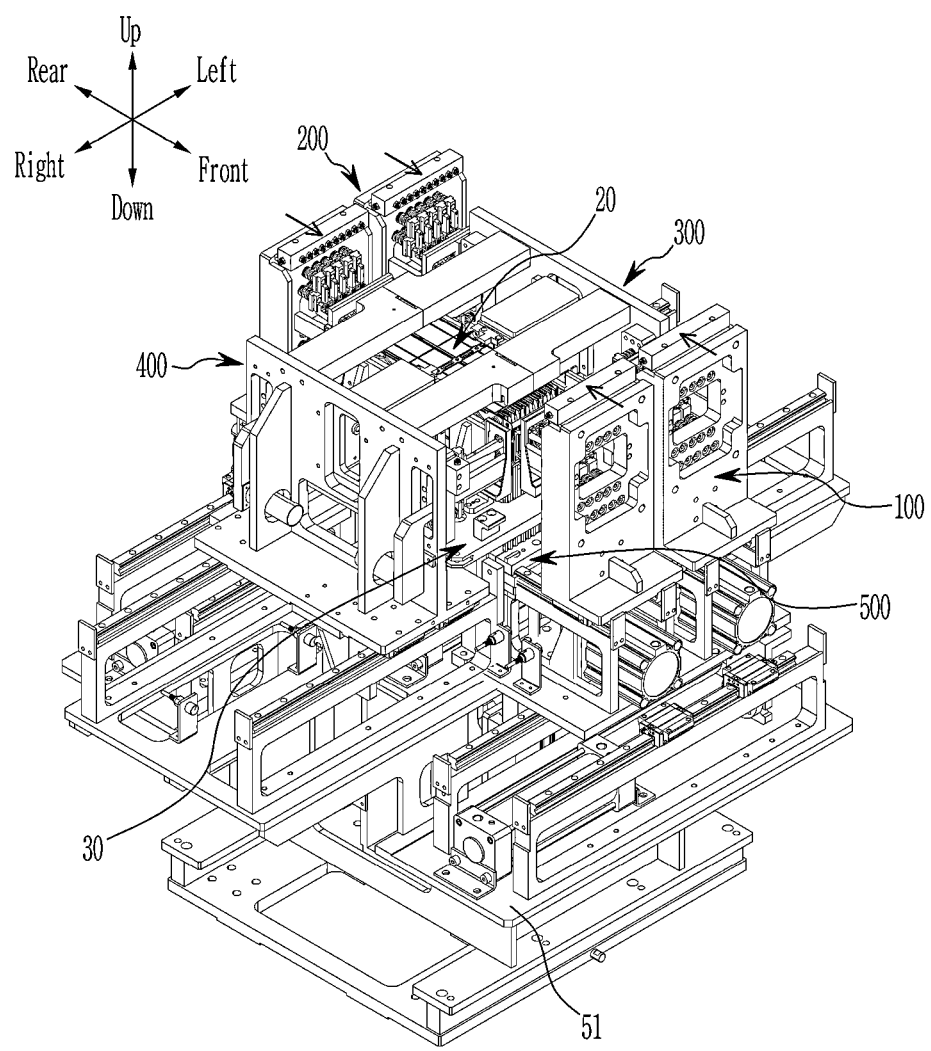

Referring to FIG. 15D, the front jig 100 moves toward the battery module assembly 20, which is the welding object, and the rear jig 200 moves toward the battery module assembly 20, which is the welding object. In addition, the front side and the rear side of the battery module assembly, which is the welding object, are supported by the front jig 100 and the rear jig 200, respectively. At this time, the welding cartridge 130 of the front jig 100 contacts the front side welding portion (around the front side of the front sensing board 22) of the battery module assembly 20, which is the welding object, and the welding cartridge 130 of the rear jig 200 contacts the rear welding portion (around the rear side of the rear sensing board 23), through which the front side and the rear side of the battery module assembly 20 are pressurized and supported by the front jig 100 and the rear jig 200.

FIG. 16A to FIG. 16D are views illustrating an operation of the welding cartridge 130 according to an embodiment.

Figure 16A:
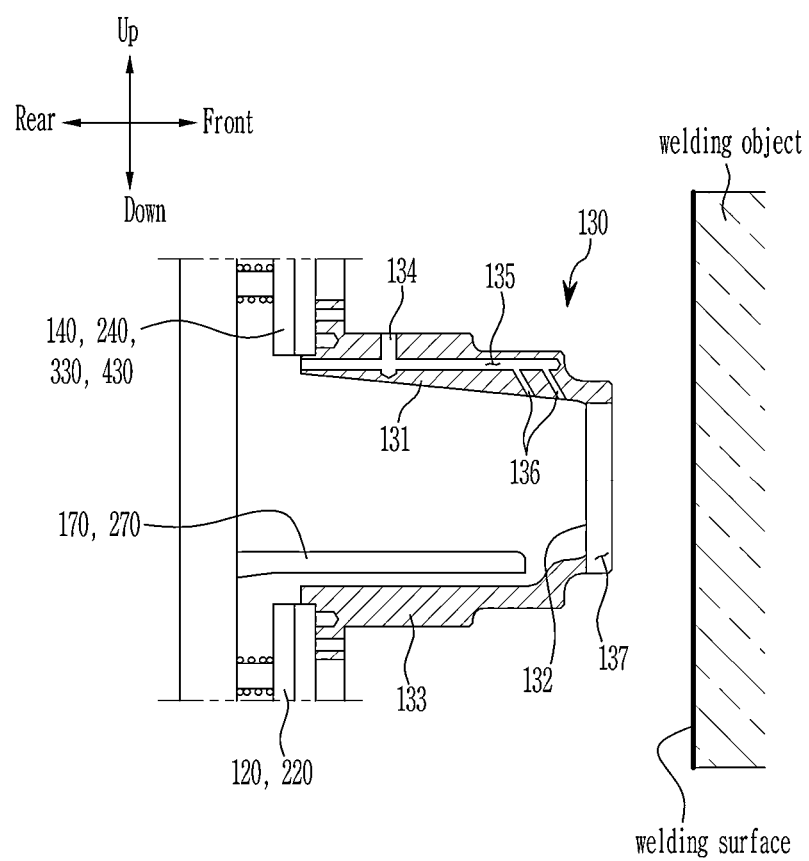
FIG. 16A to FIG. 16D are views showing an operation of a welding cartridge according to an embodiment.

Referring to FIG. 16A, an end portion of the connection supporting portion 132 of the welding cartridge 130 of each of the front jig 100, the rear jig 200, the left-side jig 300, and the right-side jig 400 is disposed apart from the welding surface of the welding object by a predetermined distance.

Figure 16B:
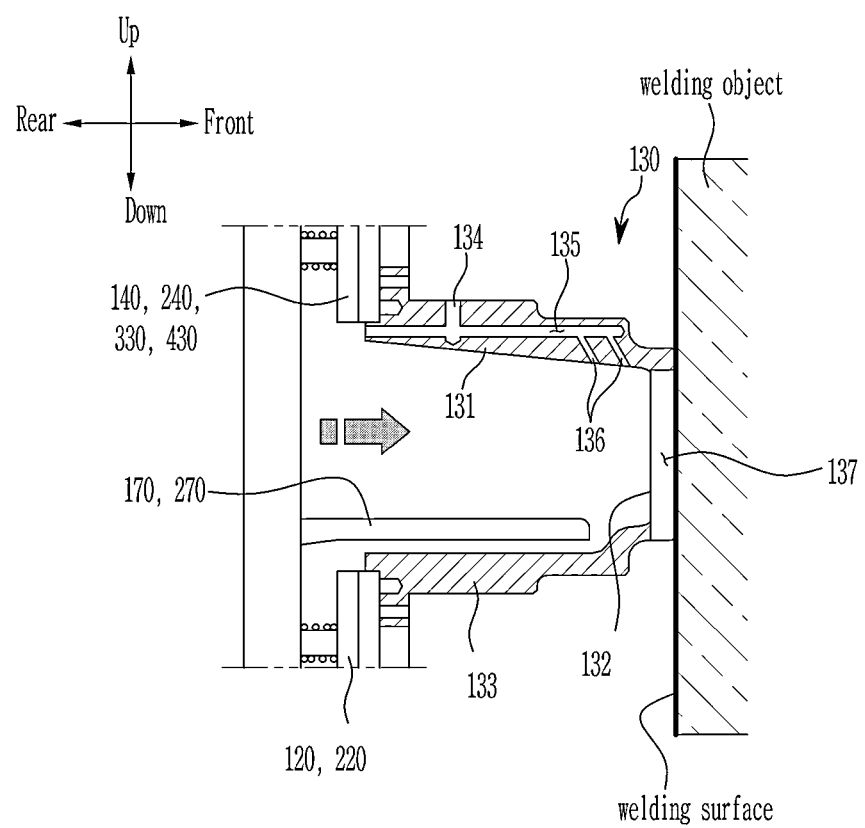

Referring to FIG. 16B, when the front jig 100, the rear jig 200, the left-side jig 300, and the right-side jig 400 move toward the welding object, each of the front jig 100, the rear jig 200, the left-side jig 300, and the welding cartridge 130 of the right-side jig 400 becomes in tight contact with the welding surface of the welding object. At this time, an end portion of the connection supporting portion 132 of each welding cartridge 130 is in tight contact with the welding surface of the welding object.

Figure 16C:
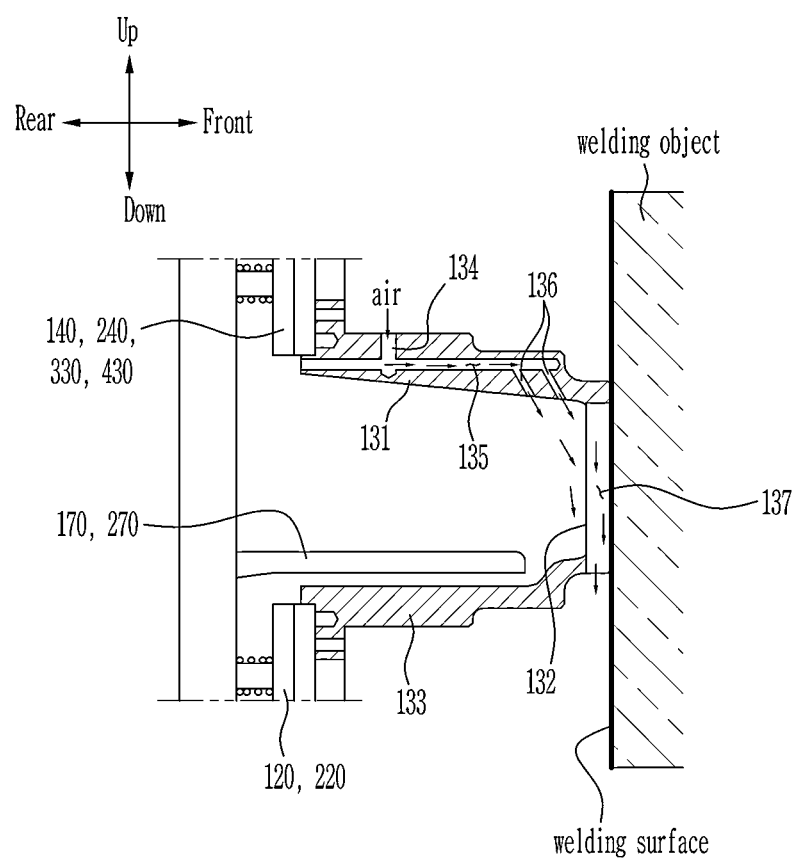

Referring to FIG. 16C, while each welding cartridge 130 is in a tight contact with a welding surface of the welding object, the air introduced from the air pump through the air inlet 134 is injected to the air outlet 136 through the air pipe 135 and the air is directly injected to the welding surface of the welding object along both inner surfaces of the connection opening 137. In addition, the laser emitted by the welder 41 of the welding robot 40 is irradiated to the welding surface through the connection opening 137, by which the welding process is performed. At this time, the spatter generated in the welding process is collected in each spatter receiver, and the fume generated during the welding process is drawn by each dust collector.

Figure 16D:
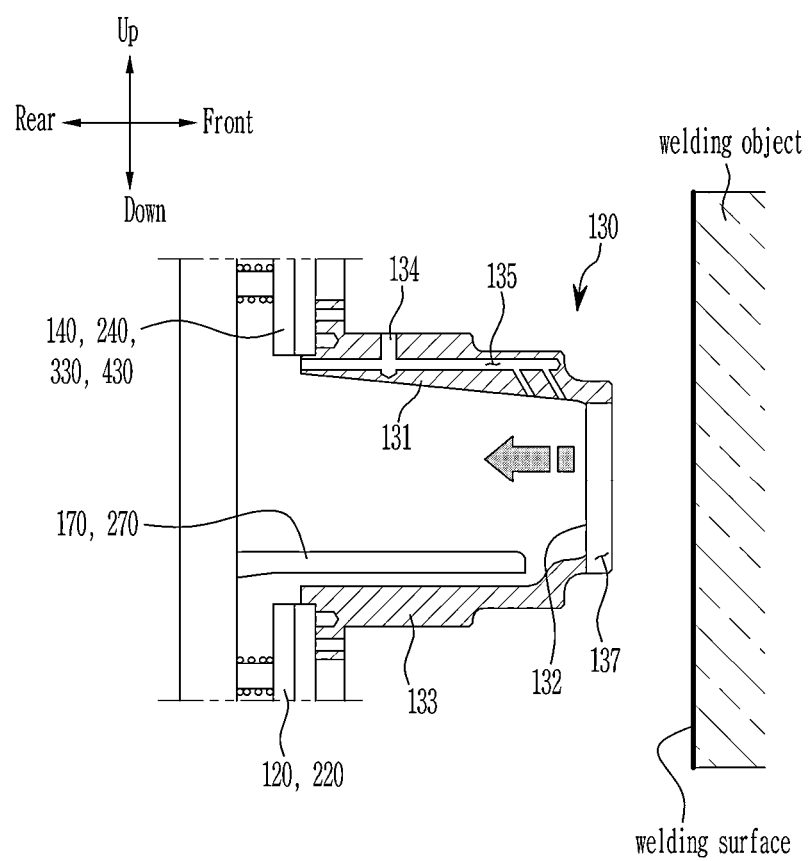
Figure 17:
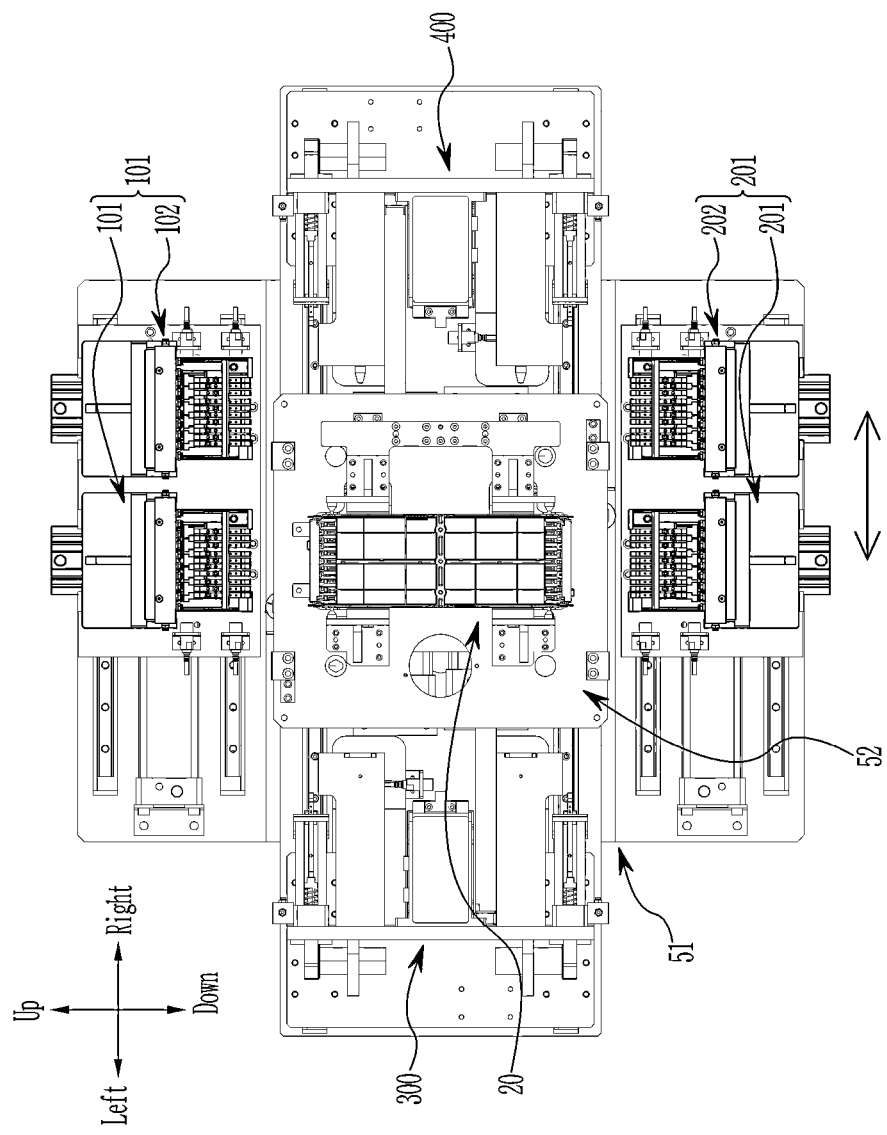
FIG. 17 is a top plan view showing a configuration of a clamping jig according to another embodiment.
Figure 18:
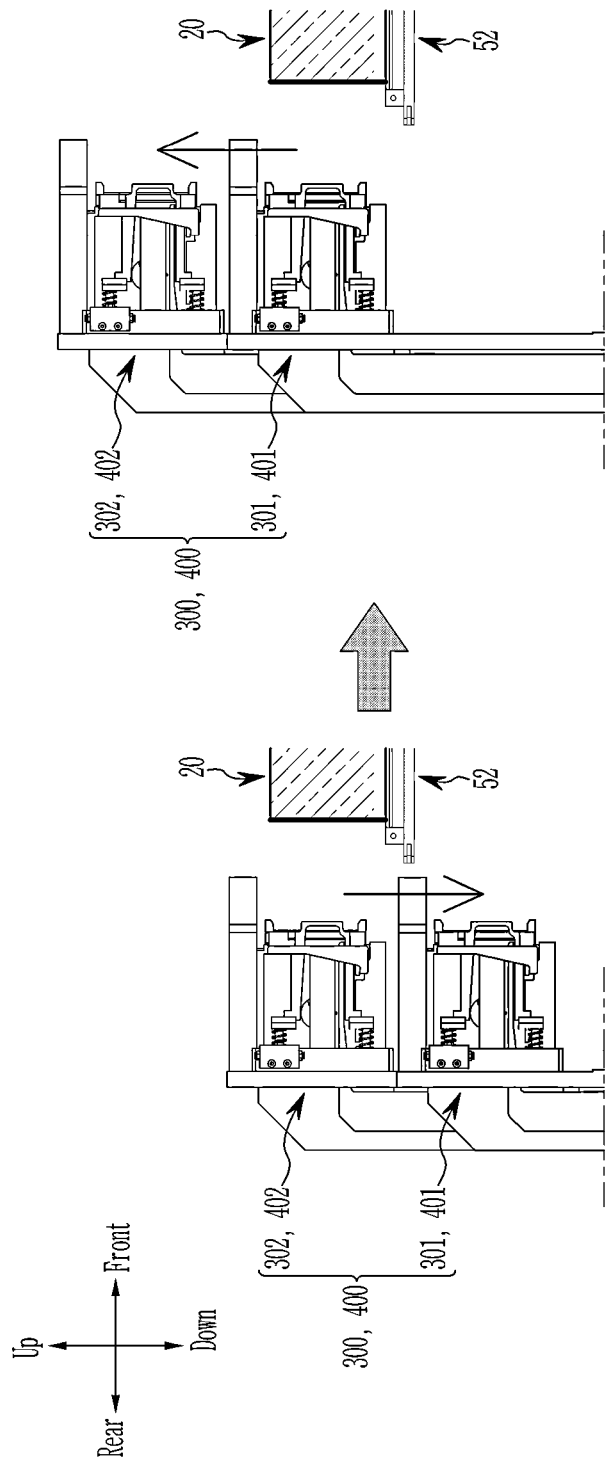
FIG. 18 is a lateral view showing a partial configuration of a clamping jig according to another embodiment.

Finally, referring to FIG. 16D, after completing the welding process, the front jig 100, the rear jig 200, the left-side jig 300, and the right-side jig 400 move in the direction away from the welding object, to move to positions the same as in FIG. 16A.

While repeatedly performing the above steps, each welding portion of the battery module assembly 20, which is the welding object, is welded.

Next, a welding process by the welding system of the present disclosure is described in detail with reference to the accompanying drawings.

The clamping jig 50 is transported to a waiting position along the first conveyor 11, and the battery module assembly 20 is seated on the clamping jig 50 by a loading-unloading module (not shown).

The battery module assembly 20 seated on the clamping jig 50 pressurized and supported, by the front jig 100, the rear jig 200, the left-side jig 300, the right-side jig 400, and the backup jig of the clamping jig 50, in the vertical and left-and-right directions of the battery module assembly 20. The clamping process of the battery module assembly 20 is as described above.

When the battery module assembly 20 is supported by the clamping jig 50, the clamping jig 50 moves along the first conveyor 11 to the welding position. The battery module assembly 20 having moved to the welding position of the first conveyor 11 is welded at respective welding portions by the two welding robots 40.

The battery module assembly completed with the welding is transported to a subsequent process along the first conveyor 11.

While the welding process is performed on the first conveyor 11, another clamping jig 50 is moved along the second conveyor 12 to a waiting position, and the battery module assembly 20 is seated on and supported by the clamping jig 50 at the waiting position.

The battery module assembly 20 completed with the welding on the first conveyor 11 is transported to a subsequent process. At this time, the clamping jig 50 waiting at the waiting position of the second conveyor 12 is transport to the welding position, and the welding portion of the battery module assembly 20 is welded by the two welding robots 40.

As such, the clamping jig 50 transported through two conveyors are transported alternating between the waiting position and the welding position, and while the battery module assembly 20 is welded at the welding position of a first one conveyor among the two conveyors, the battery module assembly 20 is clamped by the clamping jig 50 at the waiting position of a second one conveyor among the two conveyors. Therefore, the welding robot 40 immediately welds the battery module assembly 20 without a separate waiting time. Thus, the lead time performed in the welding process may be minimized.

In one embodiment, the front jig 100 and a rear jig may be provided in a plural quantity, respectively. For example, the front jig 100 includes a first front jig 101 and a second front jig 102, and the first front jig 101 and the second front jig 102 may be provided to be movable in the left-and-right direction around the central base 52 of the clamping jig 50. In addition, rear jig includes a first rear jig 201 and a second rear jig 202, and the first rear jig 201 and the second rear jig 202 may be provided to be movable in the left-and-right direction around the central base 52 of the clamping jig 50.

At this time, the first front jig 101 and the first rear jig 201 may be provided to face each other to form a corresponding pair, and the second front jig 102 and the second rear jig 202 may be provided to face each other to form a corresponding another pair.

The first front jig 101 and the first rear jig 201 may cooperate to weld welding portions formed at the front side and the rear side of the battery module assembly 20 in a predetermined specification, and the second front jig 102 and the second rear jig 202 may cooperate to weld welding portions formed at the front side and the rear side of the battery module assembly 20 of another specification.

In addition, the left-side jig and the right-side jig may be provided in a plural quantity, respectively. For example, the left-side jig includes a first left-side jig 301 and a second left-side jig 302, and the first left-side jig 301 and the second left-side jig 302 may be provided to be movable in the vertical direction.

In addition, right-side jig includes a first right-side jig 401 and a second right-side jig 402, and the first right-side jig 401 and the second right-side jig 402 may be provided to be movable in the vertical direction.

At this time, the first left-side jig 301 and the first right-side jig 401 may be provided to face each other to form a corresponding pair, and the second left-side jig 302 and the second right-side jig 402 may be provided to face each other to form a corresponding another pair.

The first left-side jig 301 and the first right-side jig 401 may cooperate to weld welding portions formed at the left side and the right side of the battery module assembly 20 of a predetermined specification, and the second left-side jig 302 and the second right-side jig 402 may cooperate to weld welding portions formed at the left side and the right side of the battery module assembly 20 of another specification.

The specification of the battery cell is different depending on the product or field to which the battery module assembly 20 is applied, and accordingly, the number and location of welding parts of the battery module assembly may be different. In preparation for this case, the front jig, the rear jig, the left-side jig, and the right-side jig may be provided in a plural quantity, respectively, and the front jig, the rear jig, the left-side jig, and the right-side jig may be replaced appropriately for the specification of the battery module assembly 20, to weld the battery module assembly 20. Through this, the battery module assembly 20 having various specifications may be welded through a single welding system, the manufacturing cost of the overall welding system may be reduced, and the lead time and cycle time required for welding the battery module assembly 20 may be minimized.

In the present disclosure, it has been described as an example that the front jig and the rear jig are provided to be movable in the left-and-right direction, and the left-side jig and the right-side jig are provided to be movable in the vertical direction. However, the scope of rights according to the present disclosure is not limited thereto. If necessary, the front jig and the rear jig may be provided to be movable in the vertical direction, and the left-side jig and the right-side jig may be provided to be movable in the left-and-right direction.

As such, since the moving directions of the front jig and the rear jig and the moving directions of the left-side jig and the right-side jig are provided to be perpendicular to each other, interference may be prevented when the front jig, the rear jig, the left-side jig, and the right-side jig are moving.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

DESCRIPTION OF SYMBOLS

10: conveyor
11: first conveyor
12: second conveyor
20: battery module assembly
21: cell stack
22: front sensing board
23: rear sensing board
24: left-side end plate
25: right-side end plate
26: upper cover
27: lower cover
28: upper clamp
29: lower clamp
30: battery pallet
31: support hole
33: backup hole
40: welding robot
41: welder
50: clamping jig
51: support base
52: central base
53: support pad
54: support protrusion
100: front jig
110: front jig main body
120: front elastic member
130: welding cartridge
131: upper supporting portion
132: connection supporting portion
133: lower supporting portion
134: air inlet
135: air passage
136: air outlet
137: connection opening
140: front insulation member
150: air pipe
160: front spatter receiver
170: front dust collector
200: rear jig
210: rear jig main body
220: rear elastic member
240: rear insulation member
260: rear spatter receiver
270: rear dust collector
300: left-side jig
310: left-side jig main body
320: left-side elastic member
330: left-side insulation member
340: left-side spatter receiver
350: left-side clamping jig
351: welding hole
360: left center spatter receiver
370: left-side air curtain
380: left-side jig extension portion
381: positioning hole
382: left-side pocket hole
400: right-side jig 410: right-side jig main body
420: right-side elastic member
430: right-side insulation member
440: right-side spatter receiver
450: right-side clamping jig
460: right center spatter receiver
470: right-side air curtain
480: right-side jig extension portion
481: positioning pin
482: right-side pocket hole
500: front backup jig
510: front backup jig main body
520: front-side backup guide pin
600: rear backup jig
610: rear backup jig main body
620: rear-side backup guide pin

What is claimed is:

1. A clamping jig, comprising:
a support base movably provided in a conveyor;
a central base on which a battery module assembly is seated in an upper portion of the support base;
at least one front jig configured to pressurize and support the battery module assembly seated on the central base from a front side;
at least one rear jig configured to pressurize and support the battery module assembly seated on the central base from a rear side;
at least one left-side jig configured to pressurize and support the battery module assembly seated on the central base from a left side;
at least one right-side jig configured to pressurize and support the battery module assembly seated on the central base from a right side; and
at least one backup jig configured to support between a sensing board and a cell stack of the battery module assembly seated on the central base,
wherein the at least one front jig, the at least one rear jig, the at least one left-side jig, the at least one right-side jig, and the at least one backup jig are movably provided according to a predetermined sequence.

2. The clamping jig of claim 1, wherein the at least one front jig comprises:
a front jig main body movably provided on the support base;
a welding cartridge provided between the front jig main body and the battery module assembly;
an elastic member provided in the front jig main body, and configured to provide an elastic force to the welding cartridge; and
an insulation member provided between the welding cartridge and the elastic member.

3. The clamping jig of claim 2, further comprising a spatter receiver provided to surround an outer boundary of the welding cartridge, and configured to collect a spatter.

4. The clamping jig of claim 2, further comprising a dust collector provided in a rear side of the welding cartridge, and configured to intake fume.

5. The clamping jig of claim 2, wherein the at least one rear jig is provided to face the at least one front jig, and formed in a symmetrical shape.

6. The clamping jig of claim 1, wherein the at least one left-side jig comprises:
a left-side jig main body movably provided on the support base;
a welding cartridge provided between the left-side jig main body and the battery module assembly;
an elastic member provided in the left-side jig main body, and configured to provide an elastic force to the welding cartridge;
an insulation member provided between the welding cartridge and the elastic member; and
a clamping jig protruding from the left-side jig main body toward the battery module assembly.

7. The clamping jig of claim 6, further comprising an air curtain configured to inject air to a welding hole, wherein the welding hole is formed in the clamping jig.

8. The clamping jig of claim 6, further comprising a spatter receiver provided in a lower portion of the clamping jig and configured to collect spatter.

9. The clamping jig of claim 6, further comprising a jig extension portion protruding from the left-side jig main body toward the battery module assembly,
wherein a positioning hole or a positioning pin is formed in an end portion of the jig extension portion, and
wherein a pocket hole is formed in a lower portion of the jig extension portion.

10. The clamping jig of claim 6, wherein the at least one right-side jig is provided to face the at least one left-side jig, and formed in a symmetrical shape.

11. The clamping jig of claim 10, wherein moving speeds of the at least one left-side jig and the at least one right-side jig, and pressurizing forces of the battery module assembly by the at least one left-side jig and the at least one right-side jig are set to be different from each other.

12. The clamping jig of claim 2, wherein the welding cartridge comprises:
an upper supporting portion;
a lower supporting portion; and
a connection supporting portion configured to connect the upper supporting portion and the lower supporting portion and being formed with a connection opening.

13. The clamping jig of claim 12, further comprising:
an air inlet formed in the upper supporting portion and configured to receive air;
an air outlet formed in the connection supporting portion and configured to inject air; and
an air passage formed in the upper supporting portion and the connection supporting portion and configured to provide communication between the air inlet and the air outlet.

14. The clamping jig of claim 12, wherein a cross-section of the connection opening is formed to become narrower toward the battery module assembly.

15. The clamping jig of claim 12, wherein the elastic member is provided between the upper supporting portion and a front jig main body, and between the lower supporting portion and the front jig main body, respectively.

16. The clamping jig of claim 1, wherein the at least one backup jig comprises:
a backup jig main body movably provided on the support base; and
at least one backup guide pin extending upward from the backup jig main body.

17. The clamping jig of claim 16, wherein:
the at least one backup jig includes two backup jigs; and
the two backup jigs are provided to face each other, and formed in a symmetrical shape.

18. The clamping jig of claim 1, wherein:
the at least one front jig includes a plurality of front jigs configured to move in a predetermined direction,
the at least one rear jig includes a plurality of rear jigs configured to move in the predetermined direction; and the at least one front jig and the at least one rear jig are replaceable based on specification of the battery module assembly.

19. The clamping jig of claim 1, wherein:

the at least one left-side jig and the at least one right-side jig are provided in a plural quantity to be movable in a predetermined direction, respectively; and the at least one left-side jig and the at least one right-side jig are replaceable based on specification of the battery module assembly.

20. A welding system, comprising:

the clamping jig of claim 1;

two conveyors configured to transport the clamping jig; and two welding robots disposed adjacent to the two conveyors, respectively, wherein, while a battery module assembly seated on the clamping jig is welded by the welding robot at a welding position of a first conveyor among the two conveyors, the battery module assembly at a waiting position of a second conveyor among the two conveyors is clamped by the clamping jig.

\* \* \* \* \*